(12) United States Patent
Cramail et al.

(10) Patent No.: US 9,896,608 B2
(45) Date of Patent: Feb. 20, 2018

(54) BIOBASED PRE-POLYMERS AND USES THEREOF FOR PREPARING POLYMERS WHICH ARE OF USE AS ADDITIVES IN A POLY(LACTIC ACID) MATRIX

(71) Applicants: INSTITUT DES CORPS GRAS ETUDES ET RECHERCHES TECHNIQUES—ITERG, Pessac (FR); CENTRE NATIONAL DE LA RECHERCHE SCIENTIFIQUE (C.N.R.S), Paris (FR); UNIVERSITE DE BORDEAUX I, Talence (FR)

(72) Inventors: Henri Cramail, Sainte Terre (FR); Thomas Lebarbe, Bordeaux (FR); Benoit Jean-Marie Gadenne, Le Bouscat (FR); Carine Alfos, Pessac (FR)

(73) Assignees: INSTITUT DES CORPS GRAS ETUDES ET RECHERCHES TECHNIQUES—ITERG, Pessac (FR); CENTRE NATIONAL DE LA RECHERCH SCIENTIFIQUE (C.N.R.S), Paris (FR); UNIVERSITÉ DE BORDEAUX, Bordeaux (FR)

( * ) Notice: Subject to any disclaimer, the term of this patent is extended or adjusted under 35 U.S.C. 154(b) by 355 days.

(21) Appl. No.: 14/430,187

(22) PCT Filed: Sep. 20, 2013

(86) PCT No.: PCT/EP2013/069602
§ 371 (c)(1),
(2) Date: Jul. 27, 2015

(87) PCT Pub. No.: WO2014/044809
PCT Pub. Date: Mar. 27, 2014

(65) Prior Publication Data
US 2015/0315433 A1    Nov. 5, 2015

(30) Foreign Application Priority Data
Sep. 21, 2012   (FR) ..................................... 12 58907

(51) Int. Cl.
| | |
|---|---|
| C08G 63/02 | (2006.01) |
| C09J 167/04 | (2006.01) |
| C09J 133/06 | (2006.01) |
| C09D 133/06 | (2006.01) |
| C09D 167/04 | (2006.01) |
| D01F 6/84 | (2006.01) |
| C08G 63/06 | (2006.01) |

(Continued)

(52) U.S. Cl.
CPC ............ *C09J 167/04* (2013.01); *C08G 63/06* (2013.01); *C08G 69/44* (2013.01); *C08L 67/04* (2013.01); *C09D 133/066* (2013.01); *C09D 167/04* (2013.01); *C09J 133/066* (2013.01); *D01F 1/10* (2013.01); *D01F 6/625* (2013.01); *D01F 6/84* (2013.01); *C08L 67/00* (2013.01); *C08L 75/02* (2013.01); *C08L 75/04* (2013.01); *C08L 75/06* (2013.01); *C08L 77/12* (2013.01)

(58) Field of Classification Search
CPC ........................................................ C09D 1/00
USPC ......................................... 428/412, 413, 469
See application file for complete search history.

(56) References Cited

U.S. PATENT DOCUMENTS

| 2,156,956 A | 5/1939 | Agens |
|---|---|---|
| 3,293,225 A | 12/1966 | Wakasa et al. |

(Continued)

FOREIGN PATENT DOCUMENTS

| CN | 1 665 883 A | 9/2005 |
|---|---|---|
| CN | 102 504 215 A | 6/2012 |

(Continued)

OTHER PUBLICATIONS

Zuo et al., Polymer 52 (2011) 4503-4516.*

(Continued)

*Primary Examiner* — Terressa Boykin
(74) *Attorney, Agent, or Firm* — Knobbe, Martens, Olson & Bear, LLP

(57) ABSTRACT

The present invention relates to the use of a compound having the following formula (I):

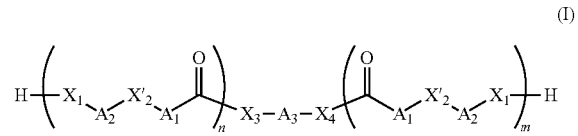

(I)

Figure 1:
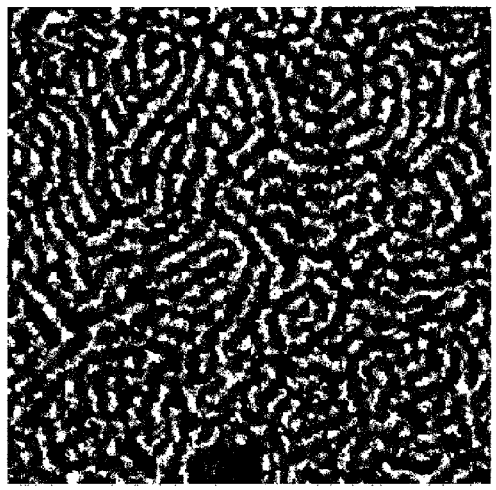
Figure 1:
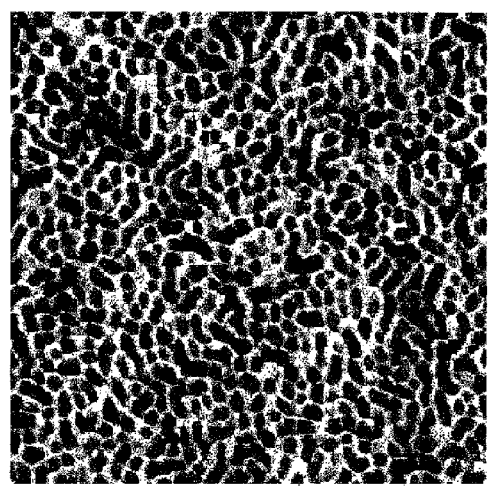
Figure 1:
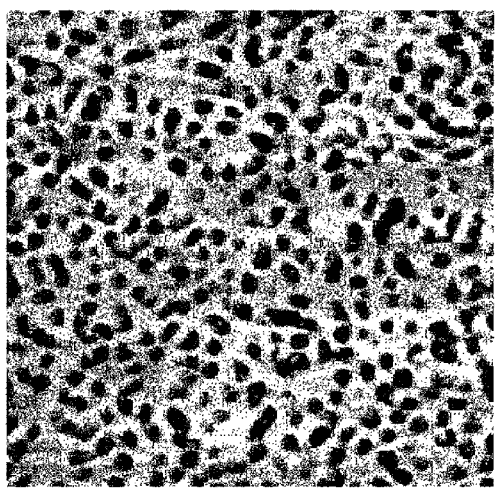
Figure 1:
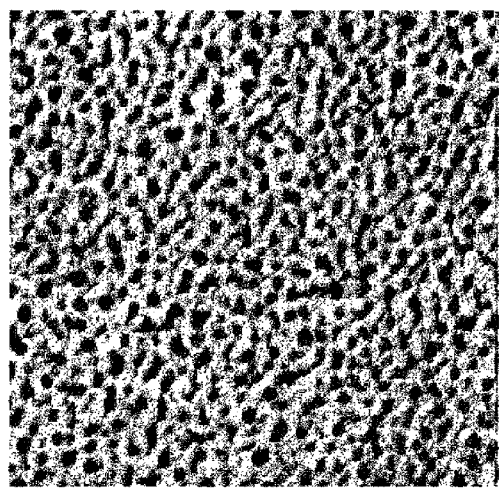

in which:
A₁ represents a divalent alkylene radical comprising from 2 to 20 carbon atoms;
A₂ represents a divalent alkylene radical comprising from 2 to 20 carbon atoms;
A₃ is selected from the group consisting of the following divalent radicals:
an alkylene comprising from 2 to 600; and
an arylene comprising from 6 to 30 carbon atoms;
X₁, X₃ and X₄ represent —O— or —NH—;
X'₂ is selected from the group consisting of: —S—, —CH₂— and a bond; and
n and m represent an integer ranging from 1 to 1000;
for the preparation of additives in a matrix of polyester, polyvinyl chloride, polyurethane, polyamide, poly(alkyl acrylate), poly(alkyl methacrylate), polystyrene or polyolefin.

14 Claims, 3 Drawing Sheets

(51) Int. Cl.

| C08G 69/44 | (2006.01) |
| C08L 67/04 | (2006.01) |
| D01F 1/10 | (2006.01) |
| D01F 6/62 | (2006.01) |
| C08L 67/00 | (2006.01) |
| C08L 75/02 | (2006.01) |
| C08L 75/04 | (2006.01) |
| C08L 75/06 | (2006.01) |
| C08L 77/12 | (2006.01) |

(56) References Cited

U.S. PATENT DOCUMENTS

| 3,661,956 | A | 5/1972 | Silverstone |
| 4,340,682 | A | 7/1982 | Legue et al. |
| 4,535,142 | A | 8/1985 | Brauer et al. |
| 5,011,629 | A | 4/1991 | Bilbo |
| 5,252,642 | A | 10/1993 | Sinclair et al. |
| 5,334,670 | A | 8/1994 | Uchida et al. |
| 5,753,782 | A | 5/1998 | Hammond et al. |
| 6,541,568 | B1 | 4/2003 | Ding et al. |
| 2003/0083440 | A1 | 5/2003 | Sashida et al. |
| 2004/0138359 | A1 | 7/2004 | Dinkelaker et al. |
| 2008/0071008 | A1 | 3/2008 | Smillie et al. |
| 2009/0030112 | A1 | 1/2009 | Nascimento et al. |
| 2010/0093543 | A1 | 4/2010 | Blease |
| 2010/0174046 | A1 | 7/2010 | Liu et al. |
| 2013/0065046 | A1 | 3/2013 | Krishnaswamy |

FOREIGN PATENT DOCUMENTS

| CN | 102504215 A | 6/2012 |
| DE | 20 65 289 A1 | 5/1973 |
| EP | 0 634 433 A2 | 1/1995 |
| EP | 0 978 536 A1 | 2/2000 |
| EP | 1 553 139 A1 | 7/2005 |
| GB | 1 416 144 | 12/1975 |
| JP | S6136373 A | 2/1986 |
| JP | 2005-113001 A | 4/2005 |
| JP | 2007-332343 A | 12/2007 |
| WO | WO 95/16750 | 6/1995 |
| WO | WO 2012/131252 A1 | 10/2012 |
| WO | WO 2012/175338 A1 | 12/2012 |

OTHER PUBLICATIONS

Ebata, et al. 2007 "Lipase-catalyzed synthesis and curing of high-molecular-weight polyricinoleate" *Macromolecular Bioscience* 7: 198-803.

Yuan, et al. 1998 "Polyurethane toughened polylactide" *Polymer Bulletin* 40: 485-490.

Harry-O'Kuru, et al. 2001 "Synthesis of estoslide esters from cis-9-octadecenoic acid estolides" *Journal of the American Oil Chemists* 78(3); 219-222.

Hayes, et al. 2012 "Modification of oligo-ricinoleic acid and its derivatives with 10-undecenoic acid via lipase-catalyzed esterification" *Polymers* 4; 1037-1055.

Ol'Khov, et al. 2003 "Composite materials based on segmented polyurethane and polyhydroxybutyrate" *International Polymer Science and Technology* 30(11); T/58-T/61.

Reihs 2005 "A reversibly switching block copolymer surface" *Langmuir* 21 10573-10580.

Robertson, et al. 2011 "Tough blends of polylactide and castor oil" *American Chemical Society* 3(9); 3402-3410.

Xu, et al. 2008 "Morphology and properties of thermoplastic polyurethanes with dangling chains in ricoinoleate-based soft segments" *Polymer* 49(19); 4248-4258.

Zuo, J. et al. 2011 "Thermoplastic polyester amides derived from oleic acid" *Polymer* 52: 4503-4516.

* cited by examiner (a) (b)

(c) (d)

Scale 1 μm * 1 μm (microns)

Scale 1 μm * 1 μm (microns)

BIOBASED PRE-POLYMERS AND USES THEREOF FOR PREPARING POLYMERS WHICH ARE OF USE AS ADDITIVES IN A POLY(LACTIC ACID) MATRIX

FIELD OF THE INVENTION

The object of the present invention relates to novel polymers, and in particular polyurethanes, polyesters and polyamides.

The object of the present invention also relates to novel pre-polymers, as well as the methods of preparation thereof, and the use thereof for the synthesis of polymers, such as polyurethanes and polyesters.

The object of the present invention also relates to the use of polymers synthesised so as to enhance the reinforcement against shocks and/or to assist in the nanostructuring of a polymer matrix, in particular of poly(lactic acid).

BACKGROUND OF THE INVENTION

Poly(lactic acid) (PLA) is a polymer which exhibits advantageous mechanical properties of interest. However, it has the disadvantage of breaking at very low elongations.

In order to remedy this problem, the solution that has been envisaged involves the incorporation of flexible polymer in a matrix of poly(lactic acid). However, it is known from the state of the art that the use of flexible polymer in a matrix of poly(lactic acid) leads to problems of incompatibility, and in particular to a strong phase segregation. In addition, the flexible polymers known to the state of the art are for the most part derived from petrochemicals. Among the flexible polymers, mention may be of polybutadiene (Tg=−80° C.), poly(propylene oxide) (Tg=−70° C.), poly(ε-caprolactone) (Tg=−60° C.).

Thus, there is a need to provide for novel flexible polymers that make it possible to enhance the reinforcement against shocks of a matrix of brittle polymers, and in particular for a poly(lactic acid) matrix, while not presenting the disadvantages of the existing polymers mentioned above.

There is also a need for novel flexible polymers that are not derived from petrochemicals.

SUMMARY OF THE INVENTION

The present invention aims to provide novel pre-polymers that are derived from bio-resources.

An object of the present invention also relates to the use of the said pre-polymers for the preparation of polyurethanes, polyesters and polyamides, that are derived from bio-resources.

Another object of the present invention is to provide novel polymers, such as polyurethanes, polyesters and polyamides, that are derived from bio-resources.

The object of the present invention also relates to the use of pre-polymers for the preparation of additives in a matrix of polyester, polyvinyl chloride, polyurethane, polyamide, poly(alkyl acrylate), polystyrene and polyolefins, and in particular in a matrix of poly(lactic acid).

A further object of the invention relates to the use of polyurethanes in the field of adhesives, surfactants, films, thermoplastic elastomers, paints and fibres.

Another object of the present invention relates to the use of formed polymers (polyurethanes, polyamides or polyesters) as additives in a matrix of polyester, poly(vinyl chloride), polyurethane, polyamide, poly(alkyl acrylate), poly(alkyl methacrylate), polystyrene and polyolefins, and in particular in a matrix of poly(lactic acid).

The present invention thus relates to the use of a compound having the formula (I):

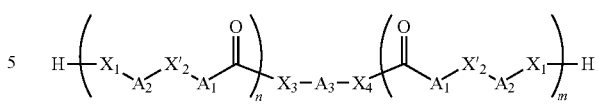

in which:
$A_1$ represents a divalent alkylene radical, which is linear or branched, comprising from 2 to 20 carbon atoms, preferably from 5 to 18, and preferably from 6 to 17, the said radical possibly comprising one or more unsaturations, and being possibly substituted by at least one substituent —OAlk, Alk representing an alkyl group comprising from 1 to 10 carbon atoms;

$A_2$ represents a divalent alkylene radical, which is linear or branched, comprising from 2 to 20 carbon atoms, preferably from 2 to 12, and preferentially from 2 to 10, the said radical possibly comprising one or more unsaturations, and being possibly substituted by at least one substituent —OAlk, Alk representing an alkyl group comprising from 1 to 10 carbon atoms;

$A_3$ is selected from the group consisting of the following divalent radicals:

a linear or branched alkylene, comprising from 2 to 600 carbon atoms, preferably from 2 to 400, and preferentially from 2 to 100, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and an arylene comprising from 6 to 30 carbon atoms, the said radical being possibly substituted by at least one substituent —OAlk, Alk representing an alkyl group comprising from 1 to 10 carbon atoms;

$X_1$, $X_3$ and $X_4$, which may be identical or different, represent, independently of one another, —O— or —NH—;

$X'_2$ is selected from the group consisting of: —S—, —CH$_2$— and a bond; and n and m represent, independently of one another, an integer ranging from 1 to 1000, preferably from 1 to 100, and preferentially from 1 to 50;

on the condition that the total number of carbon atoms of the radicals $A_1$, $A_2$ and $X'_2$ is greater than or equal to 8, preferably greater than or equal to 10;

for the preparation of additives in a matrix of polyester, poly(vinyl chloride), polyurethane, polyamide, poly(alkyl acrylate), poly(alkyl methacrylate), polystyrene or polyolefin.

According to the invention, the compounds having the following formula (I) include the following repeating units N and M:

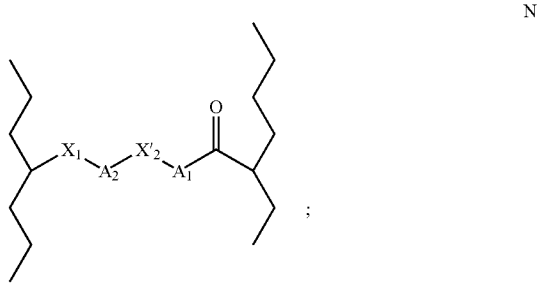

M

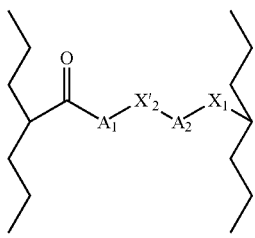

with the repeating units N being repeated n times, and the repeating units M being repeated m times.

According to the invention, the repeating units N may be identical or different depending on the value of n. Thus the groups $X_1$, $A_2$, $X'_2$ and $A_1$ may be identical or different for each repeating unit.

According to the invention, the repeating units M may be identical or different depending on the value of m. Thus the groups $X_1$, $A_2$, $X'_2$ and $A_1$ may be identical or different for each repeating unit.

According to one embodiment, the present invention relates to the use of a compound having the following formula (I-1):

(I-1)

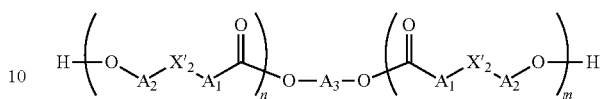

in which: $A_1$, $A_2$, $X'_2$, $X_2$, $A_3$, n and m are as previously defined above, for the preparation of additives in a matrix of polyester, poly(vinyl chloride), polyurethane, polyamide, poly(alkyl acrylate), poly(alkyl methacrylate), polystyrene or polyolefin.

According to the invention, the compounds having the formula (I-1) correspond to compounds having the formula (I) wherein $X_1$, $X_3$ and $X_4$ represent O.

According to one embodiment, the present invention relates to the abovementioned use of the compounds having the following formula (I-2):

(I-2)

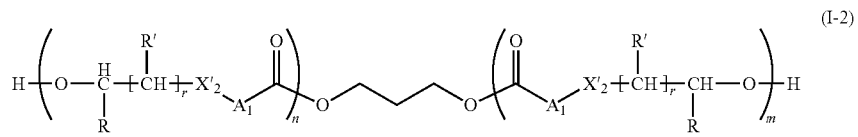

in which:

$X_1$, $X_2$, $X_3$, $A_1$, $A_3$, n and m are as previously defined above;

R represents H or a divalent alkylene radical, which is linear or branched, comprising from 1 to 19 carbon atoms, preferably from 2 to 11, preferentially from 4 to 9, the said alkylene radical being possibly substituted by at least one group —OAlk, Alk being as defined above;

R' represents H or a group —OAlk, Alk being as defined above;

r represents an integer ranging from 0 to 5, preferably from 0 to 2.

According to the invention, the compounds having the formula (I-2) correspond to compounds having the formula (I) wherein $X_1$, $X_3$ and $X_4$ represent O, $A_2$ represents —CH(R)—[CH(R')]$_r$—, and $A_3$ represents —(CH$_2$)$_3$—.

According to one embodiment, the present invention relates to the abovementioned use of the compounds having the following formula (I-3):

(I-3)

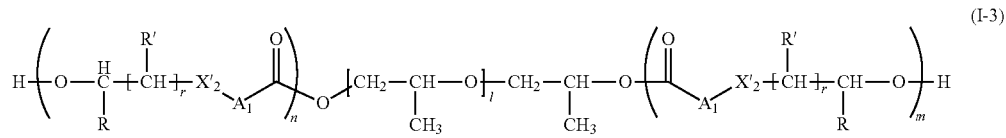

in which:

$X_1, X_2, X_3, A_1, A_3$, R, R', r, n and m are as defined above, l represents an integer ranging from 1 to 500, preferably from 1 to 80, and preferentially from 2 to 50.

According to the invention, the compounds having the formula (I-3) correspond to compounds having the formula (I) wherein $X_1$, $X_3$ and $X_4$ represent O, $A_2$ represents —CH(R)—[CH(R')]$_r$—, and $A_3$ represents —[CH$_2$CH(CH$_3$)O]$_l$—CH$_2$—CH(CH$_3$)—.

According to a particular embodiment, the compounds having the formulas (I), (I–1) and (I-2) are selected from the group consisting of compounds corresponding to one of the following formulas:

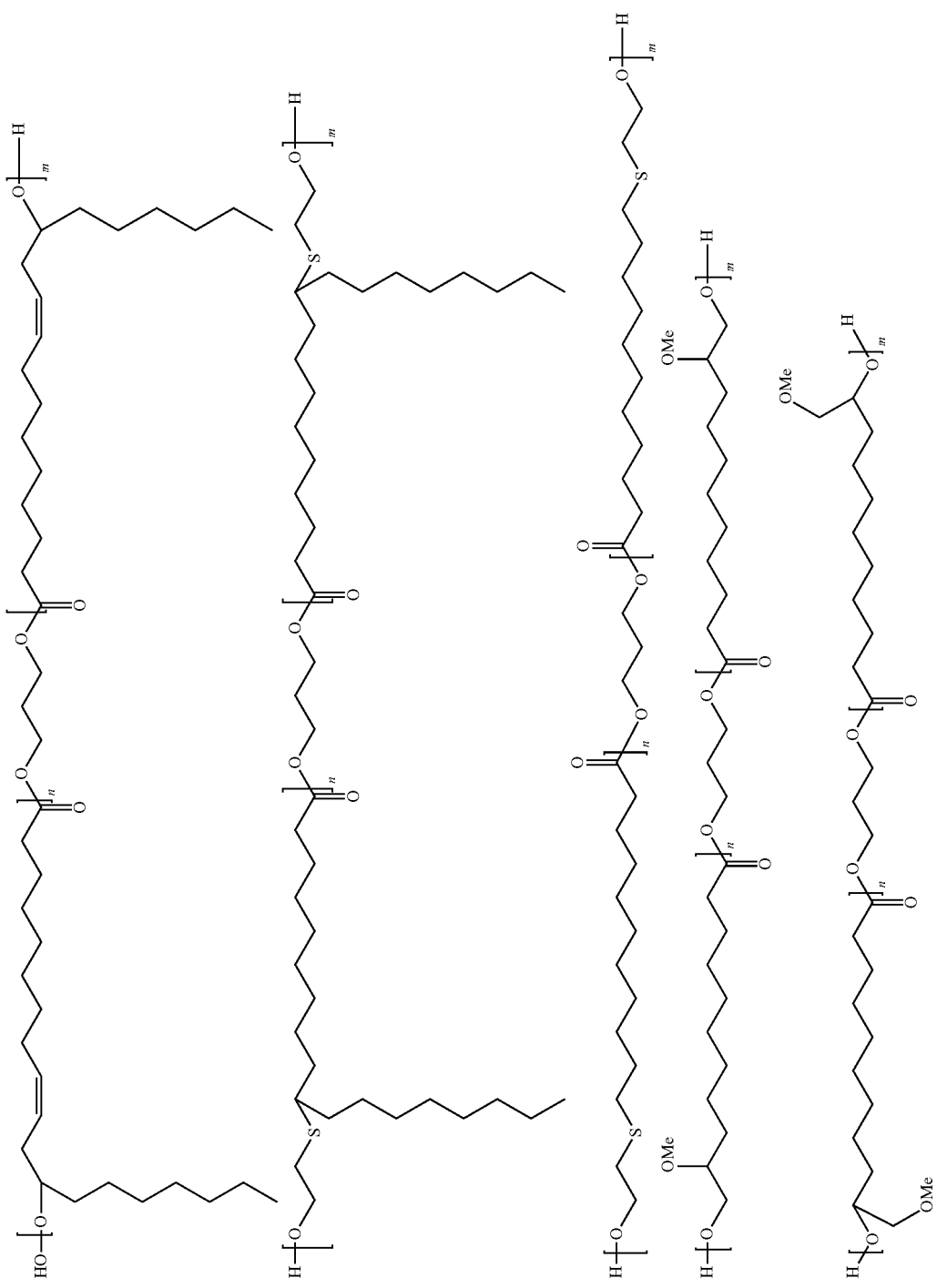

-continued
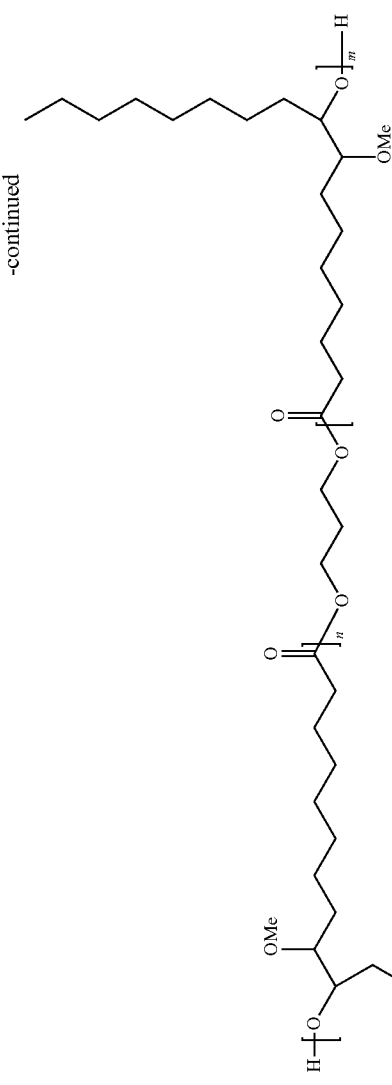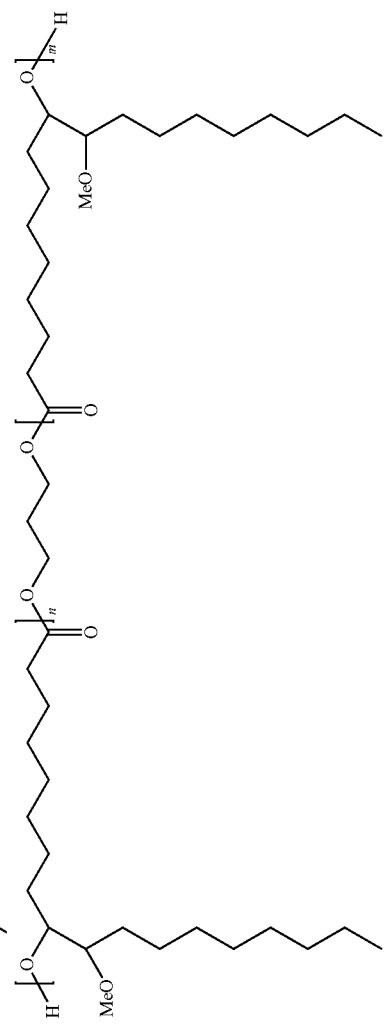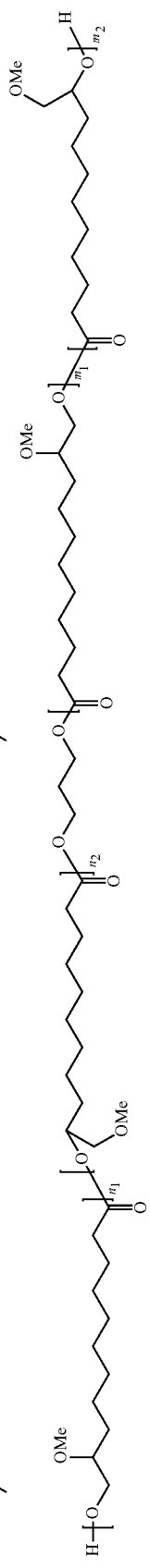

-continued
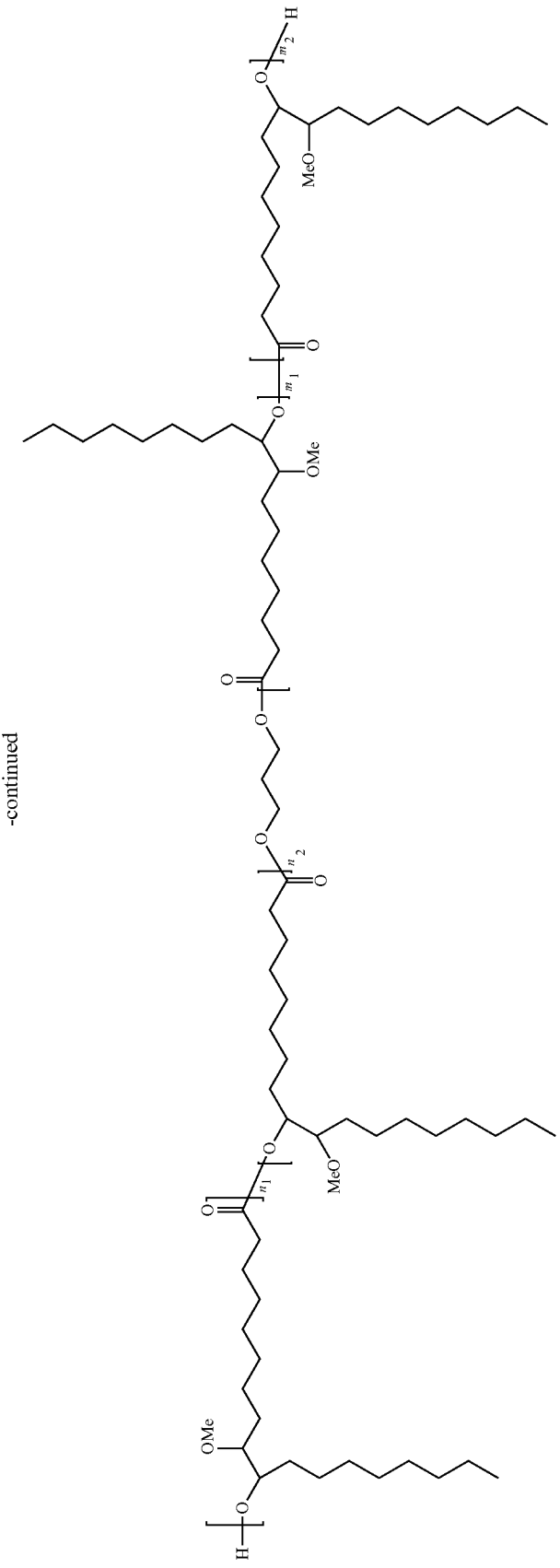

in which n and m are as previously defined above.

According to the invention, the following compounds having the formula (I):

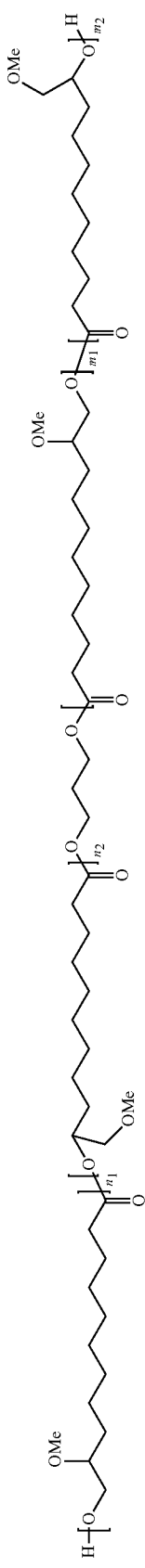
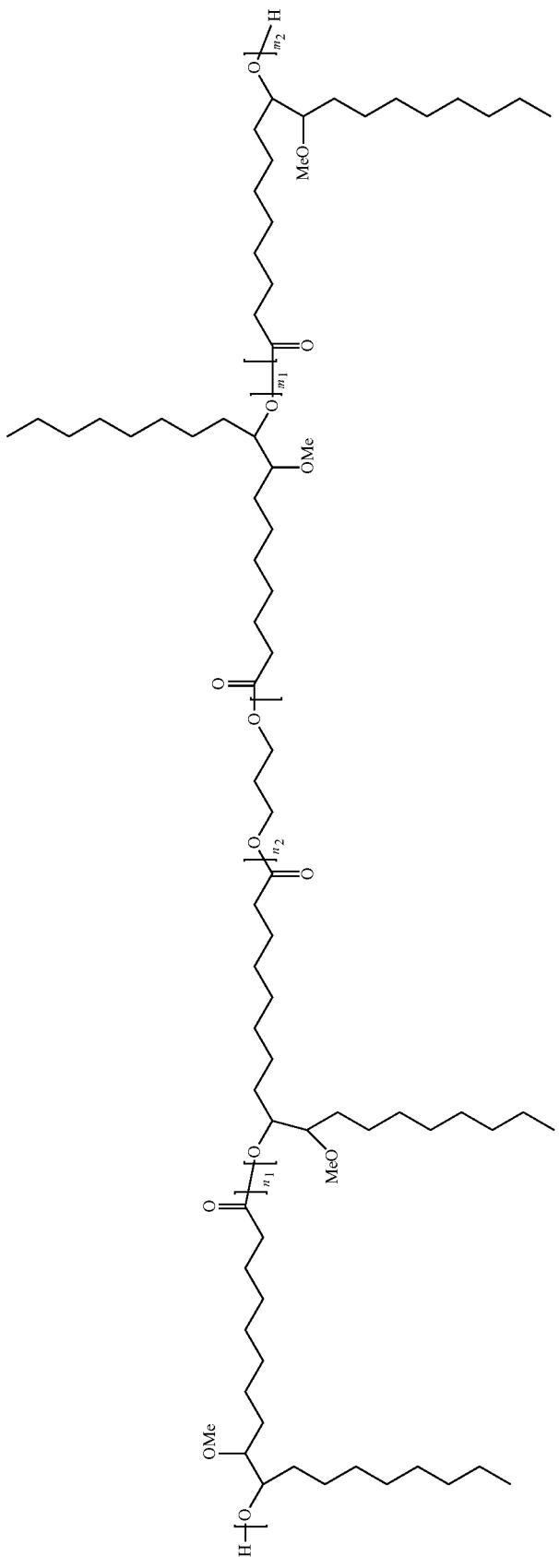

include a mixture of units N and units M. In particular, these compounds include the units $N_1$ repeated $n_1$ times, the units $N_2$ repeated $n_2$ times, the units $M_1$ repeated $m_1$ times and the units $M_2$ repeated $m_2$ times, with $n_1+n_2$ corresponding to the integer n of the formula (I) and $m_1+m_2$ corresponding to the integer m of the formula (I). In these compounds the repeating of units is random.

Preferably, among the compounds having the formulas (I), (I-1) and (I-2), mention may be made of the following compounds:

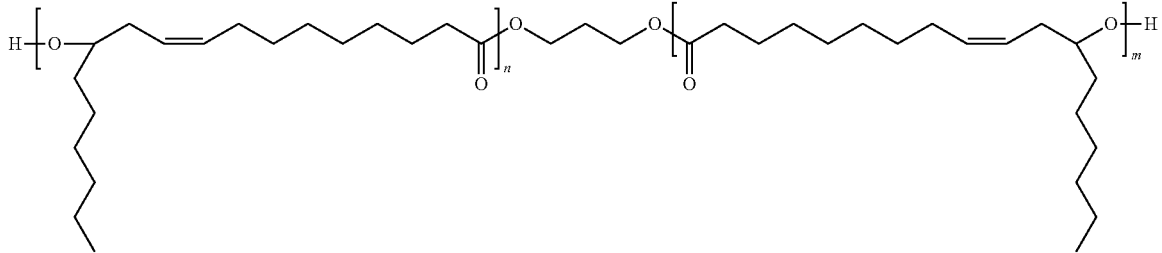

in which: n and m are as previously defined above.

Preferably, n and m are such that the sum of n+m ranges from 10 to 50, preferably from 20 to 40, and preferentially n+m represents about 36.

FIELD OF THE INVENTION

In the context of the invention, and unless otherwise stated, the term compounds having the formula (I), is used to refer to macro-initiators, precursors or pre-polymers for the preparation of additives according to the invention. For example, the compounds having the formula (I) that provide the ability to prepare the compounds having the formulas (II), (III), (IV), (V), (VI) and (VII) here are polymers.

In the context of the invention, and unless otherwise stated, the term "pre-polymer", is used to refer to oligomers or polymers having low molar masses, and in particular molar masses ranging from 200 to 20,000 g/mol, and preferentially from 500 to 10,000 g/mol.

In the context of the invention, and unless otherwise stated, the term "additives", is used to refer to the compounds having the formulas (II), (III), (IV), (V), (VI) and (VII) that are added into a polymer matrix.

In the context of the invention, and unless otherwise stated, the term "polymer matrix", is used to refer to a continuous and major dispersed phase of a polymer including a phase that is dispersed and continuous comprising of one or more additives according to the invention, and possibly at least one flexible polymer. Mention may be made, for example, of a matrix of poly(lactic acid).

According to the invention, a polyester matrix may in particular be selected from among the group consisting of: of poly(lactic acid) matrix, poly(ε-caprolactone) matrix, poly(butyrolactone) matrix.

According to the invention, a poly(alkyl acrylate) matrix may be in particular a matrix of poly(methyl acrylate), poly(butyl acrylate).

In particular, a poly(alkyl methacrylate) matrix is a matrix of poly(methyl methacrylate).

According to one embodiment, the present invention relates to the use of compounds having the formula (I) mentioned above in order to enhance the reinforcement against shocks for a matrix of polyester, polyvinyl chloride, polyurethane, polyamide, poly(alkyl acrylate), poly(alkyl methacrylate), polystyrene or polyolefins, and/or to assist in the nanostructuring of the said matrix.

In the context of the invention, and unless otherwise stated, the term "reinforcement against shocks", is used to refer to an enhancement of the mechanical properties (higher elongation at break, reduction in the brittleness of the material), in particular by means of dispersion of an additive in the matrix thereby making possible the said reinforcement against shocks.

In the context of the invention, and unless otherwise indicated, the term "agent assisting in the nanostructuring of a matrix", is used to indicate an agent assisting in the crystallisation and/or an agent assisting in the phase segregation of the said matrix in accordance with the laws of thermodynamics, leading in particular to the obtaining of cylindrical-, lamellar-, and gyroide phases.

According to one embodiment, the matrix is of the polyester type, and in particular of the poly(lactic acid) (PLA) type.

According to one embodiment, the additives are selected from the group consisting of compounds having the following formulas (II), (III), (IV), (V) and (VI):

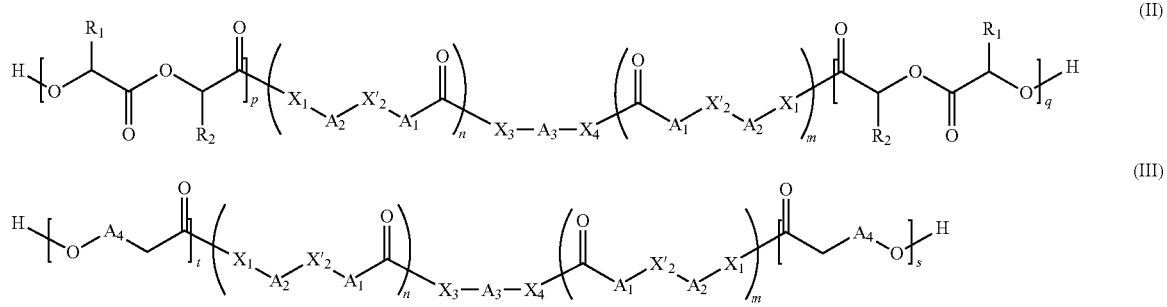

-continued

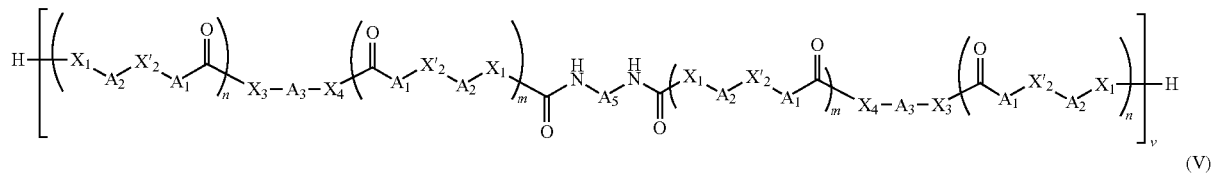
(IV)

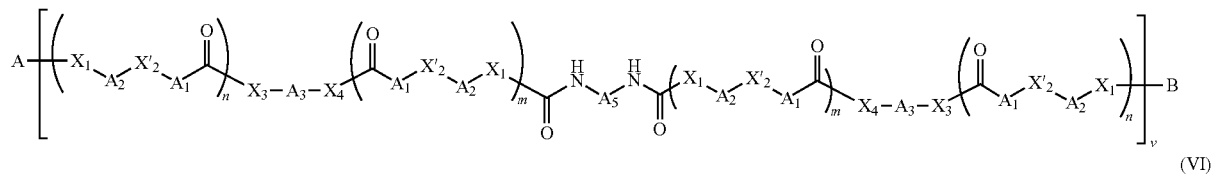
(V)

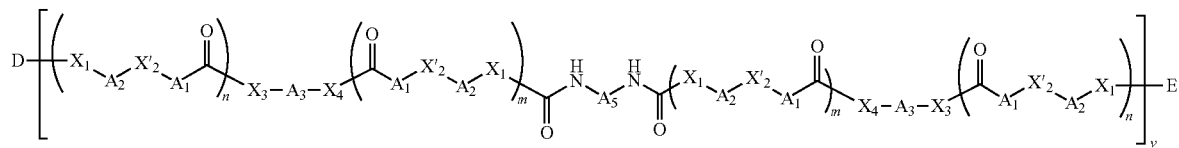
(VI)

in which $X_1$, $X'_2$, $X_3$, $A_1$, $A_2$, $A_3$, n and m are as defined above;

$R_1$ and $R_2$ represent, independently of one another, H or an alkyl group, which is linear or branched, comprising from 1 to 20 carbon atoms, preferably from 1 to 12, and preferentially from 1 to 10, wherein the said alkyl group may possibly comprise at least one double bond or one triple bond;

$A_4$ represents a divalent alkylene radical, which is linear or branched, comprising from 1 to 20 carbon atoms, preferably from 2 to 6, the said radical possibly comprising at least one unsaturation;

$A_5$ is selected from the group consisting of the radicals:
- alkylene, which is linear or branched, comprising from 1 to 20 carbon atoms, preferably from 2 to 12, the said radical possibly comprising at least one unsaturation;
- arylene, comprising from 6 to 20 carbon atoms, preferably from 6 to 12, the said arylene radical being possibly substituted;
- cycloalkylene, comprising from 3 to 20 carbon atoms, preferably from 5 to 10, the said cycloalkylene radical being possibly substituted;
- cycloalkylene-alkylene-cycloalkylene comprising from 6 to 30 carbon atoms; and
- alkylene-cycloalkylene comprising from 4 to 15 carbon atoms;

v represents an integer ranging from 1 to 5000, preferably from 1 to 1000, and preferentially from 2 to 500;

A and B represent the following radicals:

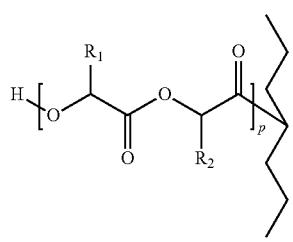
A

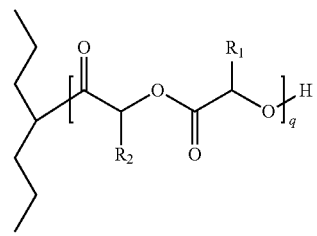
B

D and E represent the following radicals:

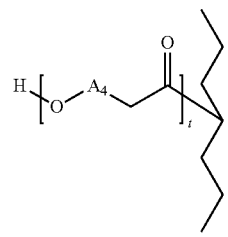
D

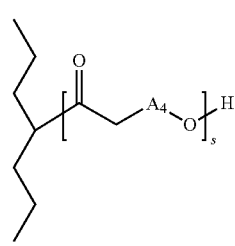
E p and q represent, independently of one another, an integer ranging from 1 to 5000, preferably from 1 to 1000, and preferentially from 2 to 500;

t and s represent, independently of one another, an integer ranging from 1 to 5000, preferably from 1 to 1000, and preferentially from 2 to 500.

Among the "alkyl" radicals, when they are linear, mention may be made of the methyl-, ethyl-, propyl-, butyl-, pentyl-, hexyl-, octyl-, nonyl-, and decyl radicals. When they are branched or substituted by one or more alkyl radicals, mention may be made of the isopropyl-, tert-butyl-, 2-ethylhexyl-, 2-methylbutyl-, 2-methylpentyl-, 1-methylpentyl-, and 3-methylheptyl radicals.

In the context of the present invention, the "alkylene" radicals represent radicals (also referred to as alkylidenes) derived from alkanes whereof the two terminal hydrogen atoms have been removed. When the said alkylene radicals are linear, they may be represented by the formula —$(CH_2)_k$—, with k corresponding to the number of carbon atoms of the alkane from which the alkylene radical has been derived.

In the context of the present invention, the "aryl" radicals represent mono-cyclic or bi-cyclic hydrocarbons comprising from 6 to 14 carbon atoms, possibly substituted. Phenyl or anthracene in particular may be cited.

In the context of the present invention, the "cycloalkyl" radical represents any non aromatic, mono- or bi-cyclic group, containing from 4 to 10 carbon atoms. Mention may be made of cyclobutyl, cyclopentyl, cyclohexyl, cycloheptyl, and cyclooctyl.

In the context of the present invention, the term "cycloalkylene" radicals, is used to refer to radicals derived from cycloalkanes of which one terminal hydrogen atom has been removed. According to the invention, the cycloalkylene radicals may be substituted by one or more (C1-C6)alkyl groups.

In the context of the invention, the term "arylene" is used to refer to a radical (also referred to as arenediyl) derived from arenes of which two hydrogen atoms have been removed. Among the arylene radicals, mention may be made, for example, of the radicals o-phenylene and benzene-1,2-diyl.

In the context of the present invention, the "arylalkyl" radicals represent an alkyl radical substituted by an aryl group. The arylalkyl radicals are the aryl-alkyl radicals, with the aryl and alkyl groups being as defined here above. Among the arylalkyl radicals, mention may be made in particular of the benzyl radical or phenethyl radical. These aralkyl groups may be substituted by one or more substituents selected from among amino, hydroxy, halogen, alkyl or alkoxy.

According to one embodiment, the present invention relates to compounds having the following formula (IA):

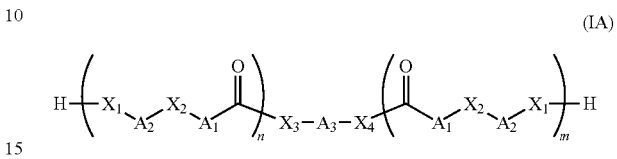

in which:

$X_1$, $X_3$, $X_4$, $A_1$, $A_2$, $A_3$, n and m are as defined above;

$X_2$ represents —$CH_2$— or a bond; and on the condition that the total number of carbon atoms of the radicals $A_1$, $A_2$ and $X_2$ is greater than or equal to 8, preferably greater than or equal to 10;

with the exception of the following compounds:

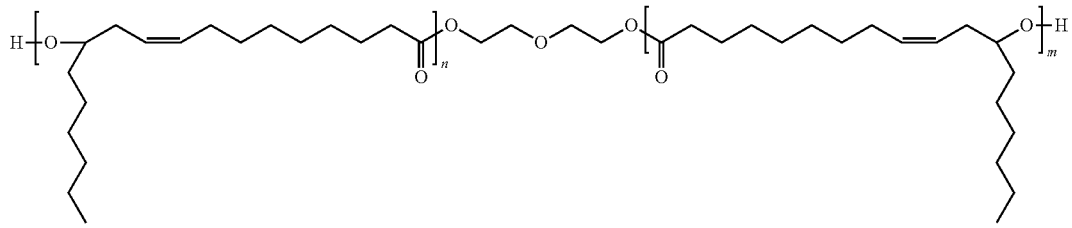

Based on another object, the present invention relates to compounds having the following formula (IA):

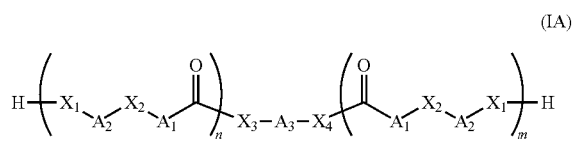

in which:

$X_1$, $X_3$, $X_4$, $A_1$, $A_2$, $A_3$, n and m are as defined above;

$X_2$ represents —$CH_2$— or a bond; and on the condition that the total number of carbon atoms of the radicals $A_1$, $A_2$ and $X_2$ is greater than or equal to 8, preferably greater than or equal to 10;

with the exception of the following compounds:

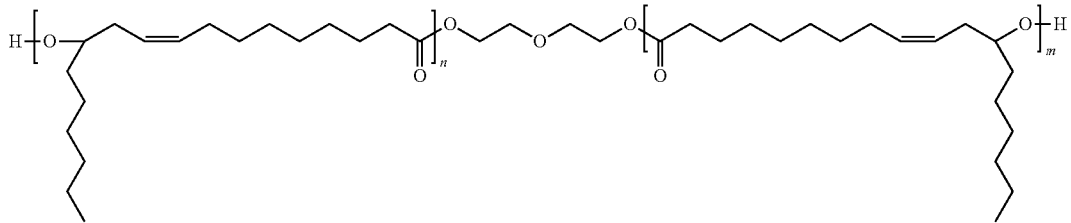

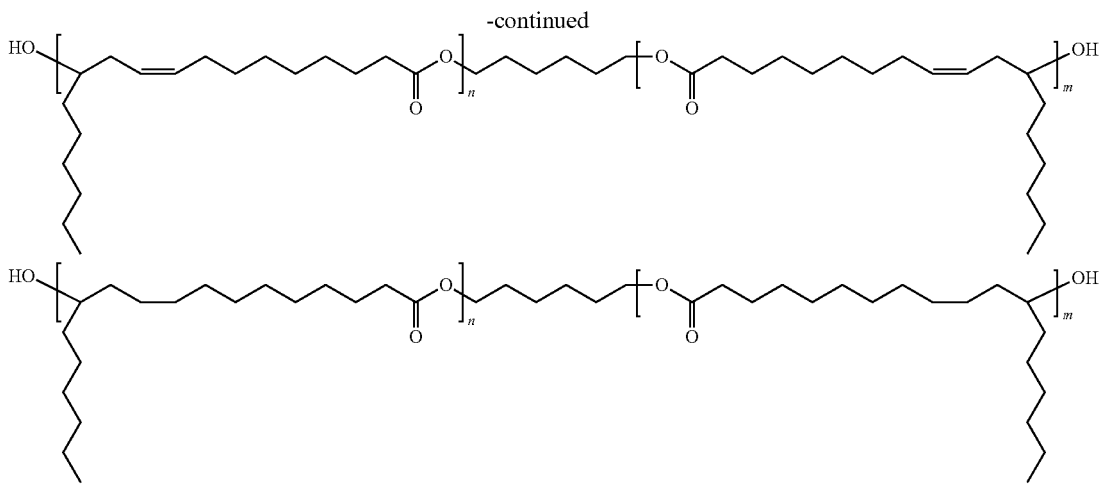

According to the invention, the compounds having the formula (IA) are compounds having the formula (I) wherein X'$_2$ corresponds to the radical X$_2$ of the formula (IA).

According to one embodiment, A$_3$ does not represent —(CH$_2$CH$_2$OCH$_2$CH$_2$)— in the formulas (I) and (IA)

According to one embodiment, A$_3$ does not represent —C$_6$H$_{12}$— in the formulas (I) and (IA).

According to one embodiment, in the compounds having the formulas (I) and (IA), X$_1$ represents O.

According to one embodiment, in the compounds having the formulas (I) and (IA), X$_1$ represents NH.

According to the invention, n and m may be identical or different.

Preferably, n ranges from 5 to 50, and preferentially from 10 to 25.

Preferably, m ranges from 5 to 50, and preferentially from 10 to 25.

According to one embodiment, in the compounds having the formulas (I) and (IA), n and m are such that the sum of n+m ranges from 10 to 50, preferably from 20 to 40, and preferentially n+m represents about 36.

According to one embodiment, in the compounds having the formulas (I) and (IA), the group A$_1$ comprises one unsaturation.

According to one embodiment, in the compounds having the formulas (I) and (IA), the group A$_1$ is not substituted.

According to one embodiment, in the compounds having the formulas (I) and (IA), the group A$_1$ represents a linear alkylene radical comprising of 9 carbon atoms and one unsaturation. Preferably the group A$_1$ represents —CH=CH—(CH$_2$)$_7$—.

According to one embodiment, in the compounds having the formulas (I) and (IA), the group A$_1$ represents —(CH$_2$)$_7$—.

According to one embodiment, in the compounds having the formulas (I) and (IA), the group A$_1$ represents —(CH$_2$)$_6$—.

According to one embodiment, in the compounds having the formulas (I), the Group A$_1$ represents a branched alkylene radical, comprising of 17 carbon atoms. Preferably, the group A$_1$ represents —CH[(CH$_2$)$_7$CH$_3$]—(CH$_2$)$_8$—.

According to one embodiment, in the compounds having the following formula (I), the group A$_1$ represents —(CH$_2$)$_{10}$—.

According to one embodiment, in the compounds having the following formula (IA), the group X$_2$ represents a bond.

According to another embodiment, in the compounds having the formula (IA), the group X$_2$ represents —CH$_2$—.

According to one embodiment, in the compounds having the following formula (I), the group X'$_2$ represents S.

According to one embodiment, in the compounds having the following formula (I), the group X'$_2$ represents —CH$_2$—.

According to one embodiment, in compounds having the formula (IA), the group X'$_2$ represents a bond.

According to one embodiment, in the compounds having the formulas (I) and (IA), the group A$_2$ represents a linear alkylene radical comprising of two carbon atoms, and being possibly substituted by a group —OAlk, in particular a group —OMe.

Preferably, the group A$_2$ represents —CH$_2$CH(OMe)- or —CH$_2$CH$_2$—.

According to another embodiment, in the compounds having the formulas (I) and (IA), the group A$_2$ represents a branched alkylene radical comprising from 2 to 10 carbon atoms, possibly substituted by a group —OAlk, in particular a group —OMe. Preferably, the group A$_2$ represents —CH[(CH$_2$)$_5$CH$_3$]—, —CH[(CH$_2$)$_7$CH$_3$]—CH(OMe)-, —CH(CH$_2$OMe)-, or —CH[CH(OMe)-(CH$_2$)$_7$—CH$_3$]—.

According to another embodiment, in the compounds having the formulas (I) and (IA), the group A$_3$ represents a linear alkylene radical comprising from 2 to 10 carbon atoms, preferably from 2 to 5 carbon atoms. Preferably the group A$_3$ represents —(CH$_2$)$_3$—.

According to one embodiment, A$_3$ represents a branched alkylene radical comprising from 2 to 100 carbon atoms, preferably from 2 to 50 carbon atoms, and preferentially 36 carbon atoms. In particular, the group A$_3$ represents the following group:

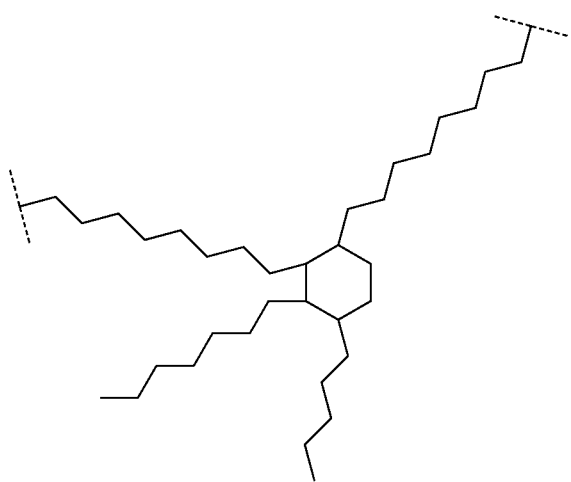

According to one embodiment, the group $A_3$ represents a branched alkylene radical comprising from 2 to 600 carbon atoms, the said radical comprising at least one oxygen atom.

Preferably, $A_3$ represents a radical —$(CH_2CH(CH_3)O)_l$—$CH_2$—$CH(CH_3)$—, with l being as previously defined above.

According to one embodiment, $A_3$ is selected from the group consisting of the following divalent radicals:
- either an alkylene radical selected from the group consisting of:
  - a linear alkylene radical comprising from 2 to 5 carbon atoms;
  - a branched alkylene radical comprising from 2 to 100 carbon atoms; and
  - a branched alkylene radical comprising from 2 to 600 carbon atoms, the said radical comprising at least one oxygen atom;
- or an arylene radical comprising from 6 to 30 carbon atoms, the said radical being possibly substituted by at least one substituent —OAlk, Alk being as previously defined above.

According to another embodiment, in the compounds having the formulas (I) and (IA), the group $X_3$ represents O or NH. Preferably $X_3$ represents O.

According to another embodiment, in the compounds having the formulas (I) and (IA), the group $X_4$ represents O or NH. Preferably, $X_4$ represents O.

According to one embodiment, the present invention relates to compounds having the following formula (IA-1):

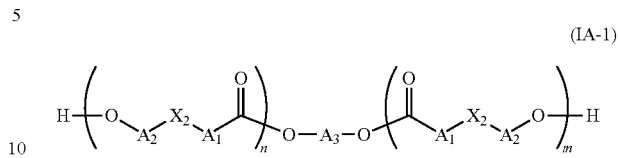

(IA-1)

in which: $A_1$, $A_2$, $X_2$, $A_3$, n and m are as previously defined above.

According to the invention, the compounds having the formula (IA-1) correspond to compounds having the formula (IA) wherein $X_1$, $X_3$ and $X_4$ represent O.

According to one embodiment, the present invention relates to compounds having the following formula (IA-2):

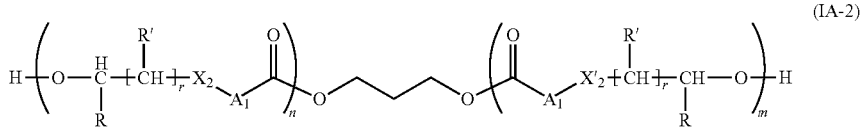

(IA-2)

in which: $X_1$, $X_2$, $X_3$, $A_1$, $A_3$, R, R', r, n and m are as previously defined above.

According to the invention, the compounds having the formula (IA-2) correspond to compounds having the formula (IA) wherein $X_1$, $X_3$ and $X_4$ represent O, $A_1$ represents —CH(R)—[CH(R')]$_r$— and $A_3$ represent —$(CH_2)_3$—.

According to one embodiment, in the compounds having the formulas (IA-2) and (I-2), r represents 0 or 1.

According to one embodiment, in the compounds having the formulas (IA-2), $X_2$ represents a bond or $CH_2$.

According to one embodiment, in the compounds having the formula (I-2), $X'_2$ represents $CH_2$.

According to one embodiment, in the compounds having the formula (I-2), $X'_2$ represents S.

According to one embodiment, in the compounds having the formulas (IA-2) and (I-2), R' represents H.

According to one embodiment, in the compounds having the formulas (IA-2) and (I-2), R' represents —OAlk, and in particular —OMe.

According to one embodiment, in the compounds having the formulas (IA-2) and (I-2), R represents H.

According to one embodiment, in the compounds having the formulas (IA-2) and (I-2), R represents —$(CH_2)_5CH_3$.

According to one embodiment, in the compounds having the formulas (IA-2) and (I-2), R represents —$(CH_2)_7CH_3$.

According to one embodiment, in the compounds having the formulas (IA-2) and (I-2), R represents —$(CH_2)_7CH_3$.

According to one embodiment, in the compounds having the formulas (IA-2) and (I-2), R represents —$CH_2OMe$.

According to one embodiment, in the compounds having the formulas (IA-2) and (I-2), $A_1$ represents —CH=CH—$(CH_2)_7$.

According to one embodiment, in the compounds having the formulas (IA-2) and (I-2), $A_1$ represents —$(CH_2)_6$—.

According to one embodiment, in the compounds having the formulas (IA-2) and (I-2), $A_1$ represents $-(CH_2)_7-$.

According to one embodiment, in the compounds having the formulas (IA-2) and (I-2), $A_1$ represents $-(CH_2)_{10}-$.

According to one embodiment, in the compounds of formula formulas (IA-2) and (I-2), $A_1$ represents $-CH[(CH_2)_7CH_3]-(CH_2)_8-$.

According to one particular embodiment, the compounds having the formulas (IA), (IA-1) and (IA-2) are selected from the group consisting of:

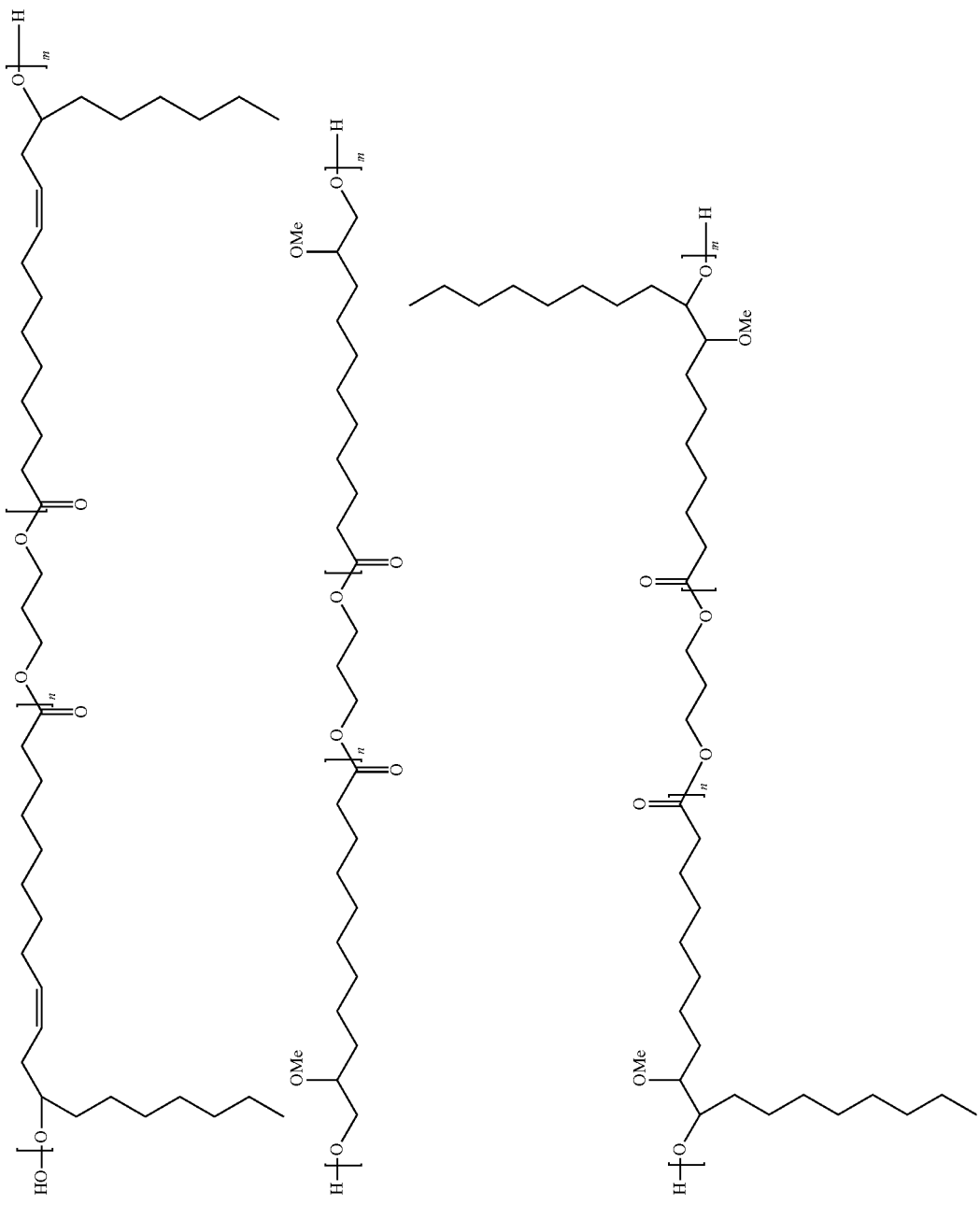

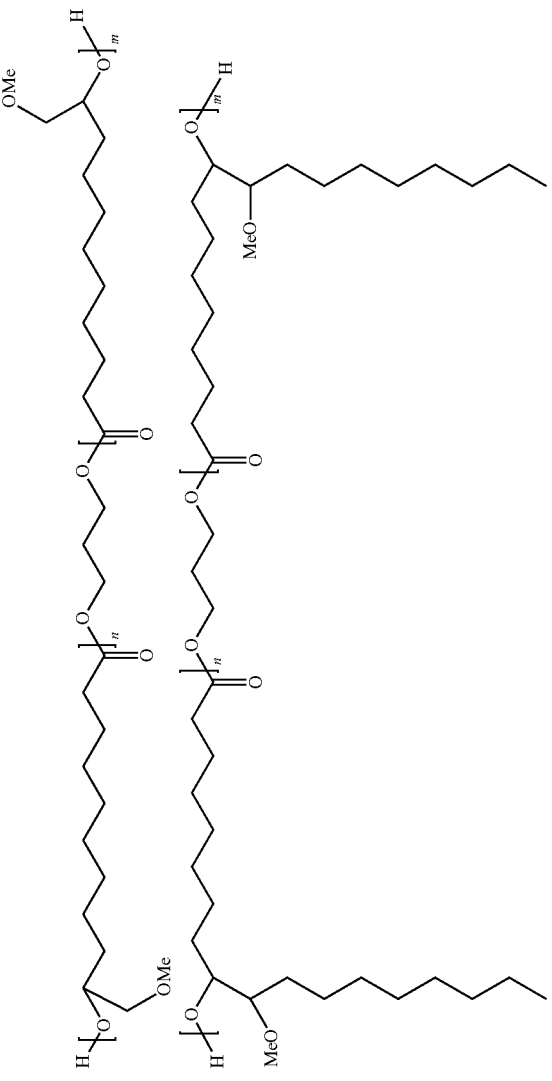
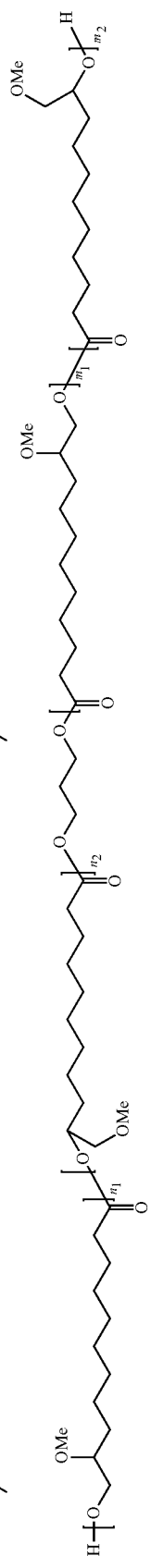

-continued
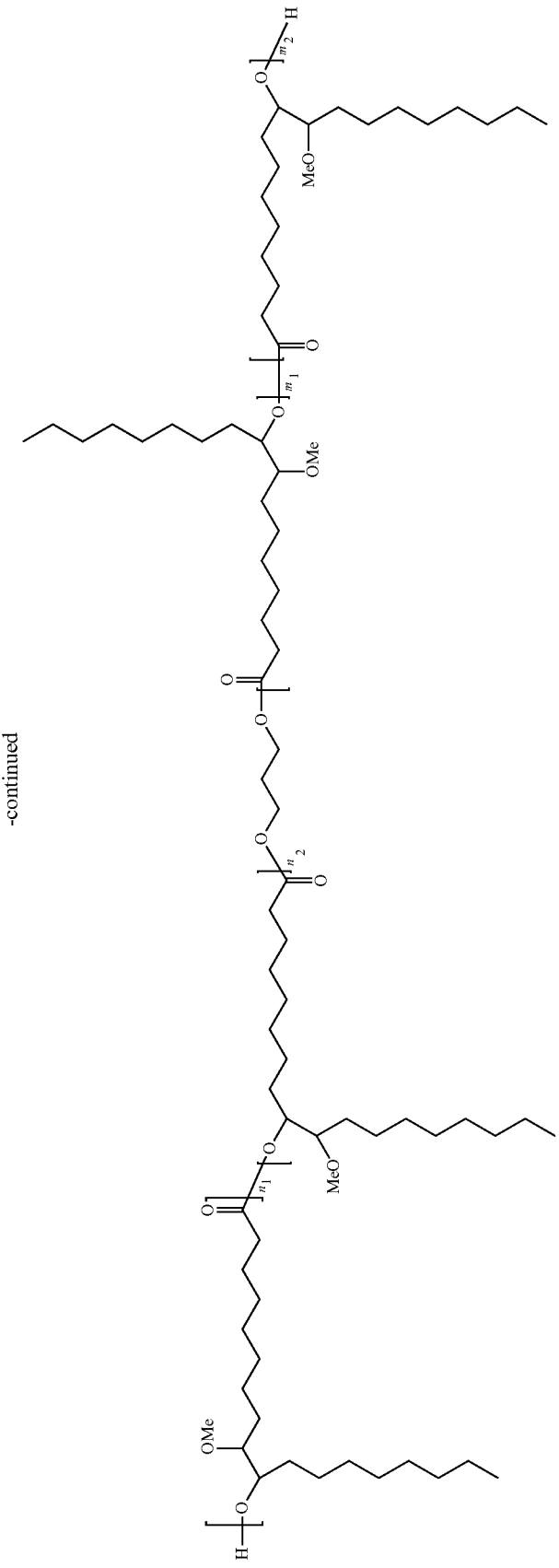

in which n, m, $n_1$, $n_2$, $m_2$ and $m_1$ are as previously defined above.

Preferably, among the compounds having the formulas (IA), (IA-1) and (IA-2), mention may be made of the following compounds:

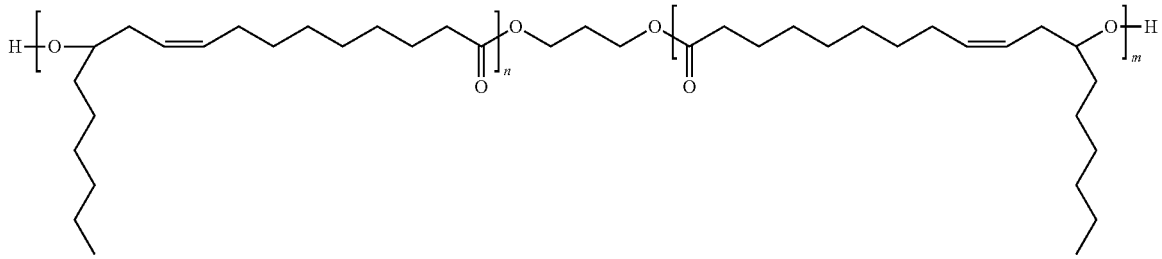

wherein n and m are as previously defined above.

According to one embodiment, the present invention relates to compounds having the following formula (IA-3):

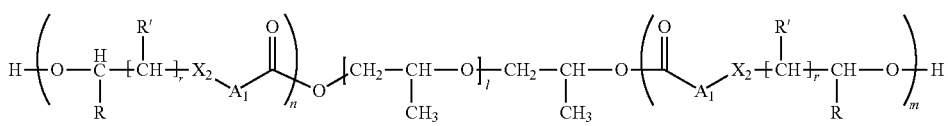

in which: $X_1$, $X_2$, $X_3$, $A_1$, $A_3$, R, R', l, r, n and m are as previously defined above in the formula (IA).

According to the invention, the compounds having the formula (IA-3) correspond to compounds having the formula (IA) wherein $X_1$, $X_3$ and $X_4$ represent O, $A_1$ represents $-CH(R)-[CH(R')]_r-$ and $A_3$ represents $-[CH_2CH(CH_3)O]_l-CH_2-CH(CH_3)-$.

According to one embodiment, in the compounds having the formulas (IA-3) and (I-3), r represents 0 or 1.

According to one embodiment, in the compounds having the formulas (IA-3), $X_2$ represents a bond or $CH_2$.

According to one embodiment, in the compounds having the formula (I-3), $X'_2$ represents $CH_2$.

According to one embodiment, in the compounds having the following formula (I-3), $X'_2$ represents S.

According to one embodiment, in the compounds having the formulas (IA-3) and (I-3), R' represents H.

According to one embodiment, in the compounds having the formulas (IA-3) and (I-3), R' represents —OAlk, and in particular —OMe.

According to one embodiment, in the compounds having the formulas (IA-3) and (I-3), R represents H.

According to one embodiment, in the compounds having the formulas (IA-3) and (I-3), R represents $-(CH_2)_5CH_3$.

According to one embodiment in the compounds having the formulas (IA-3) and (I-3), R represents $-(CH_2)_7CH_3$.

According to one embodiment, in the compounds having the formulas (IA-2) and (I-2) R represents $-(CH_2)_7CH_3$.

According to one embodiment, in the compounds having the formulas (IA-2) and (I-2), R represents $-CH_2OMe$.

According to one embodiment, in the compounds having the formulas (IA-3) and (I-3), $A_1$ represents $-CH=CH-(CH_2)_7-$.

According to one embodiment, in the compounds having the formulas (IA-3) and (I-3), $A_1$ represents $-(CH_2)_6-$.

According to one embodiment, in the compounds having the formulas (IA-3) and (I-3), $A_1$ represents $-(CH_2)_7-$.

According to one embodiment, in the compounds having the formulas (IA-3) and (I-3), $A_1$ represents $-(CH_2)_{10}-$.

According to one embodiment, in the compounds having the formulas (IA-3) and (I-3), $A_1$ represents $-CH[(CH_2)_7CH_3]-(CH_2)_8-$.

According to one particular embodiment, among the compounds having the formula (IA-3), mention may be made of the following compounds:

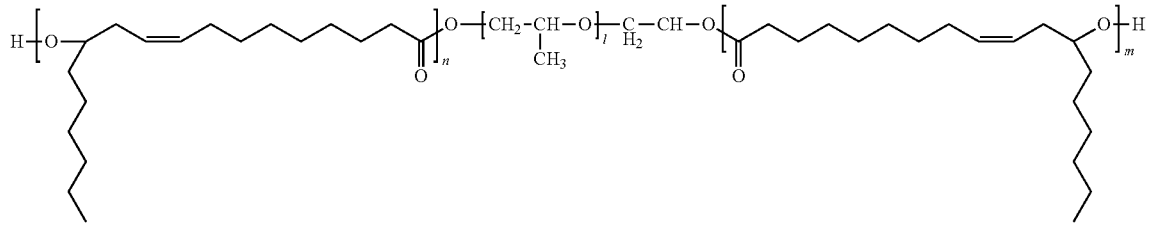

in which n, l and m are as previously defined above.

According to one embodiment, the present invention relates to compounds having the following formula (IA-4):

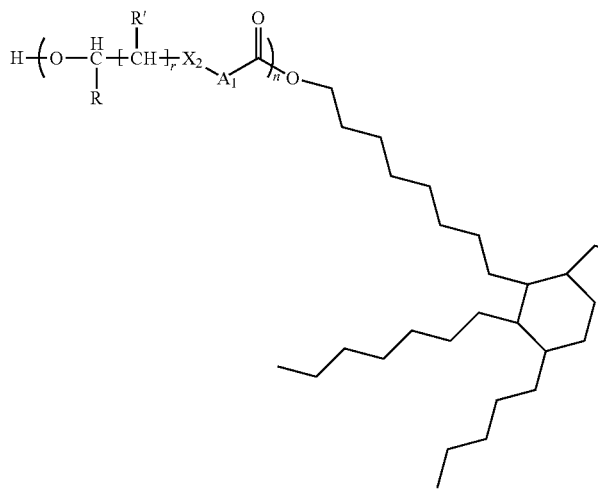
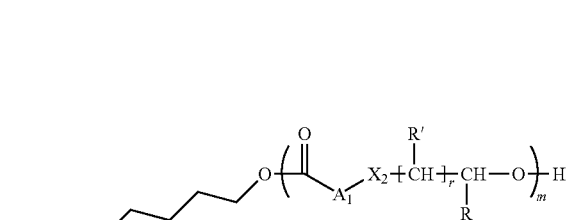

in which: $X_2$, $A_1$, R, R', r, n and m are as previously defined above in the formula (IA).

According to the invention, the compounds having the formula (IA-4) correspond to compounds having the formula (IA) wherein $X_1$, $X_3$ and $X_4$ represent O, $A_2$ represents —CH(R)—[CH(R')]$_r$— and $A_3$ represents:

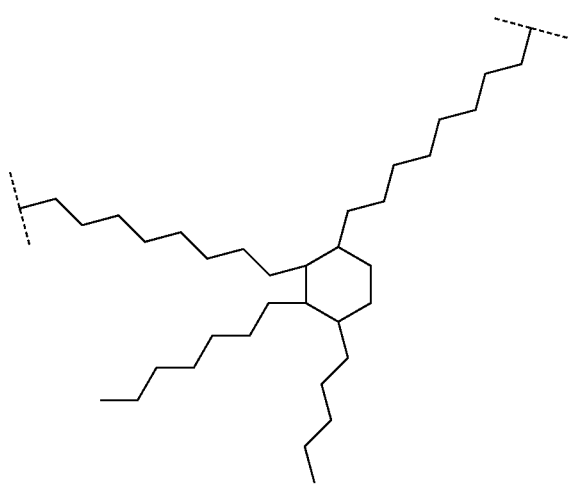

The present invention also relates to a method for preparation of compounds having the formula (IA) as defined here above, including a step of polycondensation of a compound having the formula (I'):

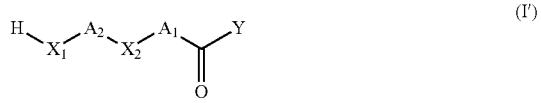

or of a mixture of compounds having the following formula (I')
in which: —Y represents —OH, —Cl or —OAlk, with Alk representing an alkyl group, which is linear or branched, comprising from 1 to 20 carbon atoms, preferably from 1 to 10, and preferentially from 1 to 2;

$X_1$, $X_2$, $A_2$ and $A_1$ are as previously defined above;
with a compound having the following formula (II'):

$$H\text{—}X\text{-}A\text{-}X\text{—}H \quad (II').$$

in which: $X_3$, $X_4$ and $A_3$ are as previously defined above.

According to the invention, the compounds having the formula (II') may be selected from the group consisting of diols, diamines and aminoalcohols.

In the context of the invention, and unless otherwise stated, the term "amino alcohol", is used to refer to a mixed compound having the formula (II') comprising one hydroxy radical —OH and one amino radical —$NH_2$. Mention may be made, for example of the compounds having the formula (II) wherein $X_3$ (or $X_4$) represents O and $X_4$ (or, respectively, $X_3$) represents NH, that is to say: HO-$A_3$-$NH_2$.'

According to the invention, when the compounds having the formula (II') represent diols, that is to say HO-$A_3$-OH, they may be selected from among the group consisting of: ethylene glycol, propylene glycol, 1,3-propanediol, 1,4-butanediol, 1,3-butanediol, 1,5-pentanediol, poly(propylene glycol), poly(ethylene glycol) and a diol of C36 dimer fatty acid (such as Pripol®).

According to the invention when the compounds having the formula (II') represent diamines, that is to say $H_2N$-$A_3$-$NH_2$, they may be selected from the group consisting of: ethylenediamine, 1,3-diaminopropane, 1,4-diaminobutane, 1,5-diaminopentane, 1,6-diaminohexane, $\alpha,\omega$-$NH_2$ poly(propylene glycol) (Jeffamine).

According to the invention, when the compounds having the formula (II') represent amino alcohols, they may be selected from the group consisting of: ethanolamine, propanolamine, aminopentanol, aminohexanol.

According to one embodiment, the compounds having the following formula (II') are diols.

According to one embodiment, the compound having the formula (II') is 1,3-propanediol, corresponding to a compound having the formula (II') wherein $X_3$ and $X_4$ represent O, and $A_3$ represents a propyl group.

According to one embodiment, the compound having the formula (II') is polypropylene glycol, corresponding to a compound having the formula (II') wherein $X_3$ and $X_4$ represent O, and $A_3$ represents a group —[($CH_2CH(CH_3)$ O]$_l$—$H_2$—CH($CH_3$)—, with l being as previously defined above.

According to one embodiment, the compound having the formula (II') is a C36 dimer fatty acid diol, and preferably Pripol®.

According to the invention, the compounds having the formula (I') may be hydroxy esters, hydroxy acids, amino acids or amino esters.

In the context of the invention, and unless otherwise specified, the term "hydroxy ester", is used to refer to a mixed compound having the formula (I') comprising one hydroxy radical —OH and one ester radical. Mention may be made for example, of the compounds having the following formula (I') wherein $X_1$ represents O and Y represents —OAlk.

In the context of the invention, and unless otherwise stated, the term "hydroxy acid", is used to refer to a mixed compound having the formula (I') comprising one hydroxy radical —OH and one carboxylic acid radical. Mention may be made for example, of the compounds having the following formula (I') wherein $X_1$ represents O and Y represents OH.

In the context of the invention, and unless otherwise stated, the term "amino acid", is used to refer to a mixed compound having the formula (I') comprising one amino radical —NH$_2$ and one carboxylic acid radical. Mention may be made, for example of compounds having the formula (I') wherein $X_1$ represents NH and Y represents OH.

In the context of the invention, and unless otherwise stated, the term "hydroxy ester", is used to refer to a mixed compound having the formula (I') comprising one amino radical —NH$_2$, and one ester radical. Mention may be made, for example of compounds having the formula (I') wherein $X_1$ represents NH and Y represents —OAlk.

According to the invention, the compounds having the formula (I') may be selected from the group consisting of:

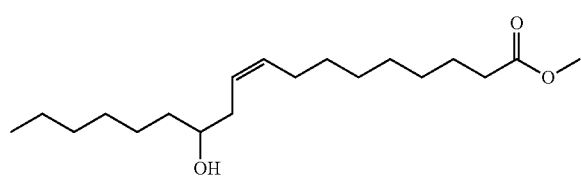 [SMILES: CCCCCCC(O)C/C=C\CCCCCCCC(=O)OC]

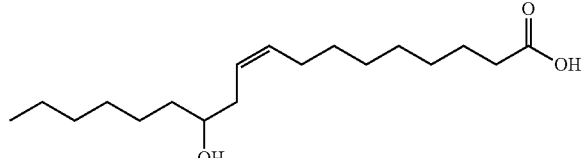

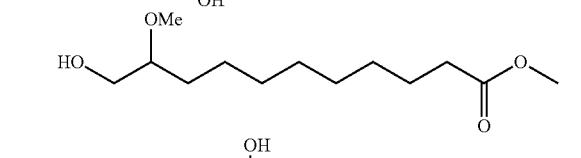

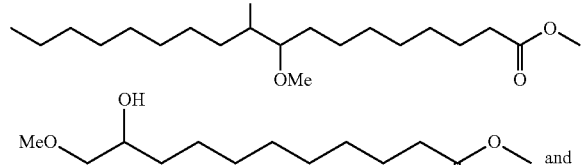

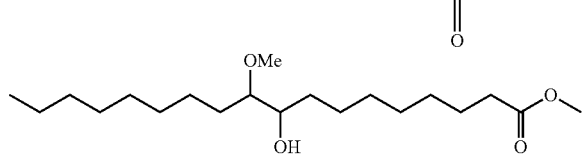

According to the invention, the method for preparation of compounds having the formula (IA) may be carried out in the presence of a mixture of compounds having the formula (I'), with the compounds having the formula (I') being different. The compounds having the formula (I') may differ in terms of the nature of the substituents $X_1$, $A_2$, $X_2$, $A_1$ or Y.

According to one embodiment, the method for preparation of compounds having the formula (IA) is carried out in the presence of a mixture of the following compounds having the formula (I'):

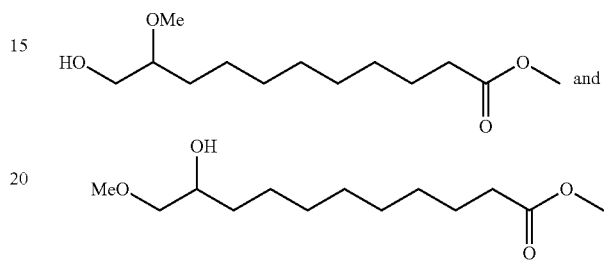

According to one embodiment, the method for preparation of compounds having the formula (IA) is carried out in the presence of a mixture of the following compounds having the formula (I'):

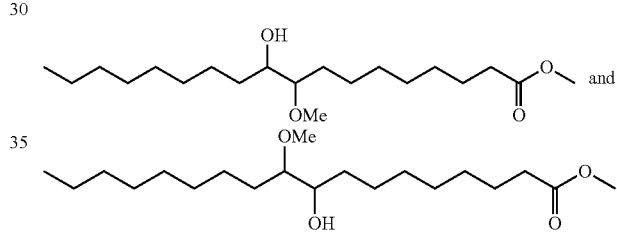

According to one embodiment, the method for preparation of compounds having the formula (IA) is carried out in the presence of the following compound having the formula (I'):

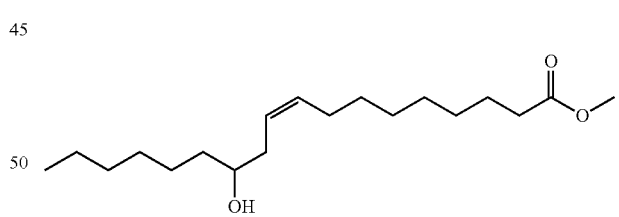

According to one embodiment, in the compounds having the formula (I'), Y represents a group —OAlk, Alk being as previously defined above. Preferably, Alk represents a methyl group.

According to another embodiment, in the compounds having the formula (I'), Y represents an OH group.

According to one embodiment, in the compounds having the formula (I'), $X_1$ represents O, $A_2$ represents —CH[(CH$_2$)$_5$CH$_3$]—, $X_2$ represents CH$_2$, $A_1$ represents —CH=CH—(CH$_2$)$_7$— and Y represents —OCH$_3$.

According to one embodiment, in the compounds having the formula (I'), $X_1$ represents O, $A_2$ represents —CH[(CH$_2$)$_5$CH$_3$]—, $X_2$ represents CH$_2$, $A_1$ represents —CH=CH—(CH$_2$)$_7$— and Y represents —OH.

According to one embodiment, in the compounds having the formula (I'), $X_1$ represents O, $A_2$ represents —$CH_2CH$(OMe)-, $X_2$ represents —$CH_2$—, $A_1$, represents —$(CH_2)_7$— and Y represents —$OCH_3$.

According to one embodiment, in the compounds having the formula (I'), $X_1$ represents O, $A_2$ represents —CH[$(CH_2)_7$ $CH_3$]—CH(OMe)-, $X_2$ represents a bond, $A_1$ represents —$(CH_2)_7$— and Y represents —$OCH_3$.

According to one embodiment, in compounds having the formula (I'), $X_1$ represents O, $A_2$ represents —CH($CH_2$OMe)-, $X_2$ represents —$CH_2$—, $A_1$ represents —$(CH_2)_7$— and Y represents —$OCH_3$.

According to one embodiment, in the compounds having the formula (I'), $X_1$ represents O, $A_2$ represents —CH[CH(OMe)$(CH_2)_7CH_3$]—, $X_2$ represents —$CH_2$—, $A_1$ represents —$(CH_2)_6$— and Y represents —$OCH_3$.

Preferably, the compound having the formula (I') is:

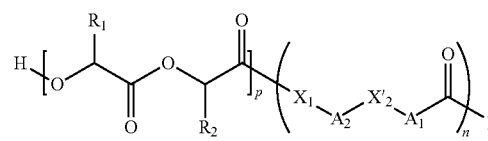

According to one embodiment, when the method for preparation of a compound having the formula (IA) is carried out in the presence of a mixture of compounds having the formula (I), the said method results in compounds having the following formula (IA) comprising repeating units N that are different, and repeating units M that are different.

According to the invention, the method for preparation of a compound having the formula (IA) can be carried out in the presence of a catalyst, in particular selected from among: $Ti(BuO)_4$, $Ti(iPrO)_4$, $Zn(Ac)_2$, $Sn(Oct)_2$, TBD, MTBD, N-heterocyclic carbenes.

In particular the catalyst is $Ti(BuO)_4$.

According to the invention, controlling of the molar ratio of the compound having the formula (II')/the compound having the formula (I') can be used to control the values of n and m.

According to one embodiment, the molar amount of a compound having the formula (II') ranges from 0.01 to 1, preferably from 0.02 to 0.08 relative to the molar amount of a compound having the formula (I').

According to one embodiment, the reaction is carried out at a temperature of 140° C. to 200° C., for several hours, and in particular for a period of one to ten hours.

According to the invention, the reaction can be performed under atmospheric pressure or under vacuum, at a pressure of 5 to 20 mbar.

According to one embodiment, when the diol is 1,3-propanediol, the reaction is carried out at 140° C. for 2 hours, and then at 180° C. for 1 hour under a stream of nitrogen, and finally under vacuum at 180° C. for a period of 10 to 24 hours approximately.

According to one embodiment, when the diol is PPG or Pripol®, the reaction is carried out at 200° C., at a pressure ranging from 6 to 20 mbar, for a period of 3 to 10 hours.

According to one embodiment, the product derived from the polymerisation reaction is subjected to a post-treatment process, by dissolution in dichloromethane and precipitation in a solvent such as methanol.

The present invention also relates to compounds having the following formula (II'):

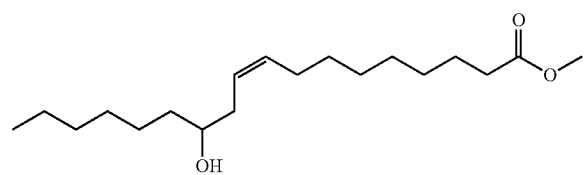

in which: $X_1$, $X'_2$, $X_3$, $X_4$, $A_1$, $A_2$, $A_3$, $R_2$, $R_1$, n, p, q and m are as previously defined above.

According to one embodiment, in the formula (II), $R_1$ represents an alkyl group as defined here above, and in particular a methyl.

According to one embodiment, in the formula (II), $R_2$ represents an alkyl group as defined above, and in particular methyl.

According to one embodiment, in the formula (II), p represents an integer ranging from 10 to 500, preferably from 50 to 300, and preferentially of about 200.

According to one embodiment, in the formula (II), q represents an integer ranging from 10 to 500, preferably from 50 to 300, and preferentially of about 200.

According to one embodiment, in the compounds having the following formula (II), $X_1$ represents O.

According to one embodiment, in the formula (II), n ranges from 5 to 50, and preferentially from 10 to 25.

According to one embodiment, in the formula (II), m ranges from 5 to 50, and preferentially from 10 to 25.

According to one embodiment, in the compounds having the following formula (II), the group $A_1$ represents a linear alkylene radical, comprising of 9 carbon atoms and one unsaturation. Preferably the group $A_1$ represents —CH=CH—$(CH_2)_7$—.

According to one embodiment, in the compounds having the following formula (II), the group $A_1$ represents —$(CH_2)_7$—.

According to one embodiment, in the compounds having the following formula (II), the group $A_1$ represents —$(CH_2)_6$—.

According to one embodiment, in the compounds having the formulas (II), the group $A_1$ represents a branched alkylene radical, comprising of 17 carbon atoms. Preferably, the group $A_1$ represents —CH[$(CH_2)_7CH_3$]—$(CH_2)_8$—.

According to one embodiment, in the compounds having the following formula (II), the group $A_1$ represents —$(CH_2)_{10}$—.

According to one embodiment, in the compounds having the following formula (II), the group $X'_2$ represents S.

According to one embodiment, in the compounds having the following formula (II), the group $X'_2$ represents —$CH_2$—.

According to one embodiment, in the compounds having the following formula (II), $A_2$ represents —$CH_2CH(OMe)$- or —$CH_2CH_2$—.

According to another embodiment, in the compounds having the formula (II), the group $A_2$ represents —CH[($CH_2)_5CH_3$]—, —CH[($CH_2)_7CH_3$]—CH(OMe)-, —CH($CH_2OMe$)-, or —CH[CH(OMe)-($CH_2)_7$—$CH_3$]—.

According to another embodiment, in the compounds having the formula (II), the group $A_3$ represents a linear alkylene radical comprising from 2 to 10 carbon atoms, preferably from 2 to 5 carbon atoms. Preferably, the group $A_3$ represents —$(CH_2)_3$—.

According to one embodiment, the group $A_3$ represents a branched alkylene radical comprising from 2 to 600 carbon atoms, with the said radical comprising at least one oxygen atom. Preferably, $A_3$ represents a radical —[$CH_2CH(CH_3)O$]$_l$—$CH_2CH(CH_3)$—, with l being as previously defined above.

According to one particular embodiment, the present invention relates to compounds having the following formula (II-1):

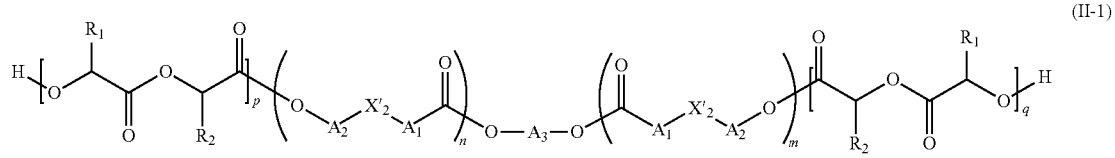

(II-1)

in which: $A_1$, $A_2$, $X_2$, $A_3$, $R_1$, $R_2$, n, m, p and q are as previously defined above.

According to the invention, the compounds having the following formula (II-1) correspond to compounds having the formula (II) wherein $X_1$, $X_3$ and $X_4$ represent O.

According to one embodiment, the present invention relates to compounds having the following formula (II-2):

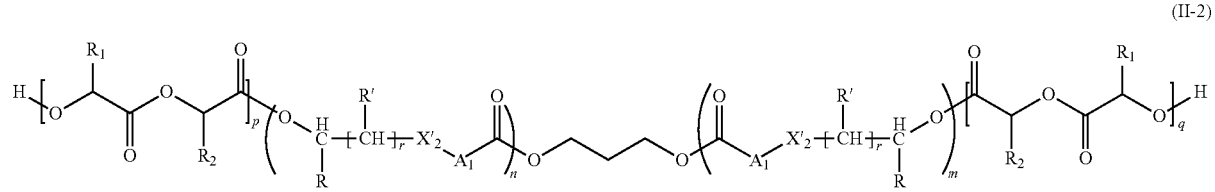

(II-2)

in which: $A_1$, $X'_2$, $R_1$, $R_2$, R, R', r, l, n, m, p and q are as previously defined above.

According to the invention, the compounds having the formula (II-2) correspond to compounds having the formula (II) wherein $X_1$, $X_3$ and $X_4$ represent O, $A_1$ represents —CH(R)—[CH(R')]$_r$—, and $A_3$ represents —$(CH_2)_3$—.

The compounds having the formulas (II-2) that are preferred are those for which, $R_1$, represents methyl, $R_2$ represents methyl, R represents —$(CH_2)_5CH_3$, r represents 0, $X'_2$ represents $CH_2$, $A_1$ represents —CH=CH—$(CH_2)_7$—.

The compounds having the formulas (II-2) that are preferred are those for which, $R_1$ represents methyl, $R_2$ represents methyl, R represents H, r represents 1, R' represents H, $X'_2$ represents S, $A_1$ represents —CH[($CH_2)_7CH_3$]—$(CH_2)_8$—.

The compounds having the formulas (II-2) that are preferred are those for which, $R_1$ represents methyl, $R_2$ represents methyl, R represents H, r represents 1, R' represents OMe, $X'_2$ represents —$CH_2$—, $A_1$ represents —$(CH_2)_7$—.

The compounds having the formulas (II-2) that are preferred are those for which, $R_1$ represents methyl, $R_2$ represents methyl, R represents H, r represents 1, R' represents H, $X'_2$ represents S, $A_1$ represents —$(CH_2)_{10}$—.

The compounds having the formulas (II-2) that are preferred are those for which, $R_1$ represents methyl, $R_2$ represents methyl, R represents —$(CH_2)_7CH_3$, r represents 1, R' represents OMe, $X'_2$ represents —$CH_2$— and $A_1$ represents —$(CH_2)_6$—.

The compounds having the formulas (II-2) that are preferred are those for which, $R_1$ represents methyl, $R_2$ represents methyl, R represents —$CH_2OMe$, r represents 0, $X'_2$ represents —$CH_2$— and $A_1$ represents —$(CH_2)_7$—.

The compounds having the formulas (II-2) that are preferred are those for which, $R_1$ represents methyl, $R_2$ represents methyl, R represents —CH(OMe)($CH_2)_7CH_3$, r represents 0, $X'_2$ represents —$CH_2$—, and $A_1$ represents —$(CH_2)_6$—.

Preferably, among the compounds having the formulas (II), (II-1) and (II-2), mention may be made of the following compounds:

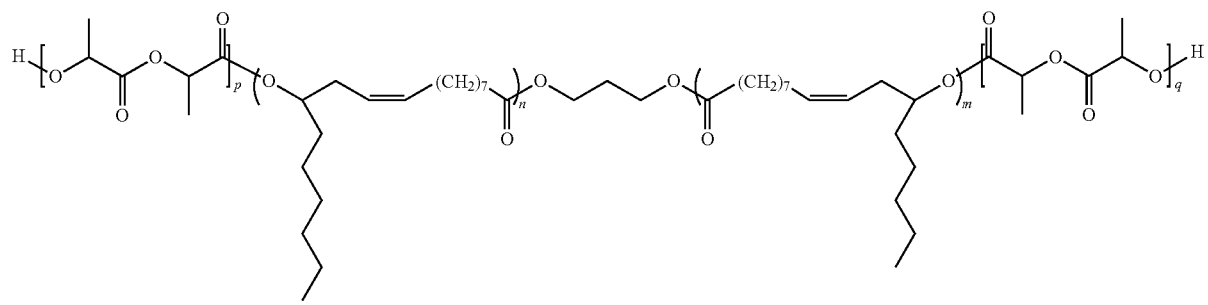

in which p, n, m and q are as previously defined above.

According to one embodiment, in the compounds having the formula (II), (II-1) and (II-2), p+q amounts to about 347 and n+m amounts to about 36.

According to one embodiment, in the compounds having the following formula (II), (II-1) and (II-2), p+q amounts to about 270 and n+m amounts to about 36.

According to one embodiment, in the compounds having the following formula (II), (II-1) and (II-2), p+q amounts to about 146 and n+m amounts to about 36.

According to one embodiment, in the compounds having the formula (II), (II-1) and (II-2), p+q amounts to about 125 and n+m amounts to about 36.

According to one embodiment, the present invention relates to compounds having the following formula (II-3):

of a compound having the following formula (VII) with a compound having the formula (I) indicated above:

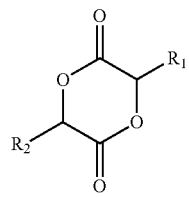

(VII)

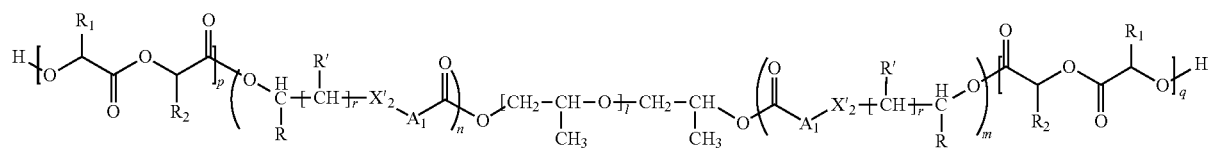

(II-3)

in which: $X_1$, $X_3$, $A_1$, $A_3$, $X'_2$, R, R', r, l, n, p, q and m are as previously defined above.

According to the invention, the compounds having the formula (II-3) are compounds having the formula (II) wherein $X_1$, $X_3$ and $X_4$ represent O, $A_1$ represent —CH(R)—[CH(R')]$_r$— and $A_3$ is represents —[CH$_2$—CH(CH$_3$)—O]$_l$—CH$_2$—CH(CH$_3$)—.

Preferably, among the compounds having the formulas (II-3), mention may be made of the following compounds:

in which $R_1$ and $R_2$ represent, independently of one another, H or an alkyl group, which is linear or branched, comprising from 1 to 20 carbon atoms, preferably from 2 to 12, and preferentially from 2 to 10, wherein the said alkyl group may possibly comprise at least one double bond.

According to the invention, the method for preparation of the compounds having the formula (II) may be carried out in the presence of a catalyst, in particular selected from the

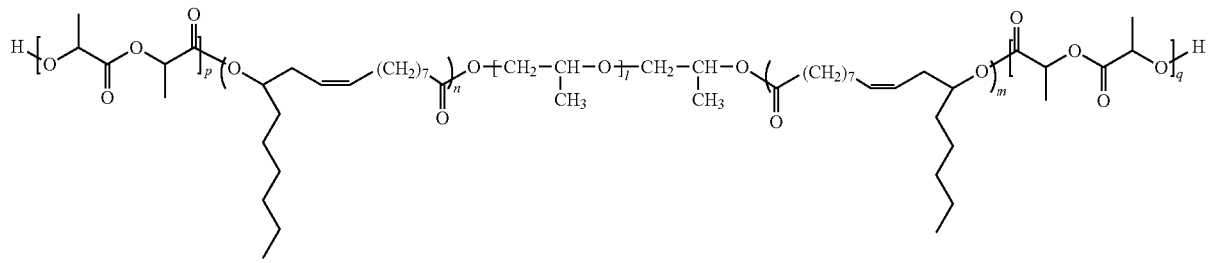

in which l, p, n, m and q are as previously defined above.

The present invention also relates to a method for preparation of compounds having the general formula (II) indicated above, including a step of ring opening polymerisation group consisting of: stannous octoate (or tin octoate) (Sn(Oct)$_2$), Ti(BuO)$_4$, Ti(iPrO)$_4$, Zn(Ac)$_2$, TBD and N-heterocyclic carbenes. Preferably, the catalyst used is stannous octoate (Sn(Oct)$_2$).

According to one embodiment, the catalyst is used in the mole percent concentration of 10 mol % to 70 mol % relative to the compound having the formula (I). Preferably, use is made of 25 mol % to 60 mol % of catalyst, and preferentially 50 mol %.

According to one embodiment, a solution of a compound (I) in a solvent such as toluene, benzene or xylene, is added into a solution of a compound (VII) in a solvent such as toluene, benzene or xylene. Preferably, a solution of a compound (I) in toluene is added to a solution of a compound (VII) in toluene.

According to the invention, the polymerisation reaction may be carried out at a temperature ranging from 60° C. to 150° C., preferably from 90° C. to 150° C. In particular, the reaction is carried out at 140° C. under reflux conditions.

Preferably, the reaction is carried out over a period of 4 hours.

According to one embodiment, in the formula (VII), $R_1$ represents a methyl group, and preferentially a levorotatory methyl group.

According to one embodiment, in the formula (VII), $R_2$ represents a methyl group, and preferentially a levorotatory methyl group.

According to the invention, the abovementioned polymerisation reaction corresponds to a ring opening polymerisation of the compound having the formula (VII), initiated by the terminal functional groups of the compound having the formula (I) indicated above.

In particular, when $X_1$ represents O, the terminal functional groups of the compounds (I) are hydroxyl functional groups.

In particular, when $X_1$ represents NH, the terminal functional groups of the compounds (I) are the amine functions.

According to the invention, the compounds having the formula (II) may correspond to block copolymers, and in particular triblock copolymers having one central block and two lateral blocks.

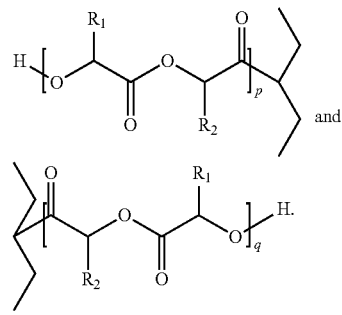
and

According to the invention, the central block may be derived from compounds having the formula (I), whereas the lateral blocks may be derived from compounds having the formula (VII).

According to the invention, the size of the lateral blocks may depend on the molar ratio of the compound having the formula (VII)/the compound having the formula (I). Thus, by causing the varying of the amount of material of the compound having the formula (VII) indicated above in relation to the amount of material of the compound having the formula (I), it is possible to obtain triblock copolymers having the formula (II) for various different compositions.

According to one embodiment, the higher the value of this ratio, the higher will be the value of p and/or q.

According to one embodiment, the molar ratio of the compound having the formula (VII)/the compound having the formula (I) ranges from 500:1 to 50:1, preferably from 450:1 to 70:1.

According to one embodiment, the weight percentage of the aforementioned lateral blocks in the compounds having the formula (II) amounts to 40% by weight, preferably 50% by weight, preferably 70% by weight, and more preferably 80% by weight, relative to the total weight of the compound having the formula (II).

The present invention also relates to compounds having the following formula (III):

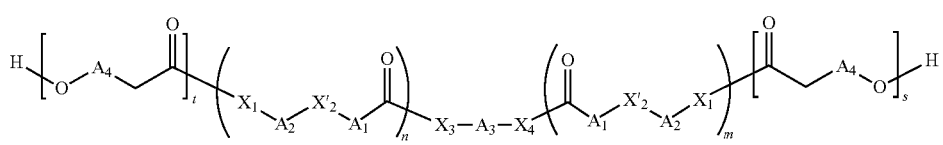

According to the invention, the triblock copolymers may include a central block corresponding in particular to:

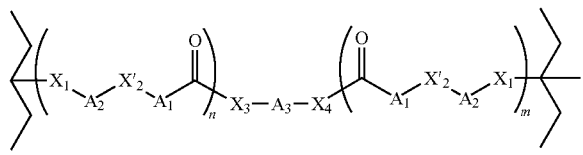

the lateral blocks on each side of the central block corresponding to:

in which: $X_1$, $X'_2$, $X_3$, $X_4$, $A_1$, $A_2$, $A_3$, $A_4$, t, s, n and m are as previously defined above.

According to one embodiment, $A_4$ represents an ethylene radical.

According to one embodiment, $A_4$ represents a propylene radical.

According to one embodiment, $A_4$ represents a butylene radical.

According to one embodiment, $A_4$ represents a pentylene radical.

According to one embodiment, $A_4$ represents a hexylene radical.

According to the invention, in the formula (III), t and s may be identical or different.

According to one embodiment, t represents an integer ranging from 2 to 500, and preferentially of about 400.

According to one embodiment, s represents an integer ranging from 2 to 500, and preferentially of about 400.

According to one particular embodiment, the present invention relates to compounds having the following formula (III-1):

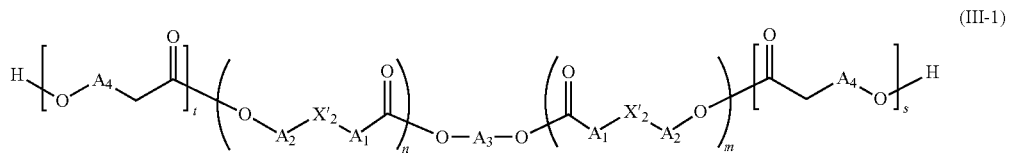
(III-1)

in which: $A_1$, $A_2$, $X'_2$, $A_3$, $A_4$, n, m, t and s are as previously defined above.

According to the invention, the compounds having the formula (III-1) correspond to compounds having the formula (III) wherein $X_1$, $X_3$ and $X_4$ represent O.

According to one embodiment, the present invention relates to compounds having the following formula (III-2):

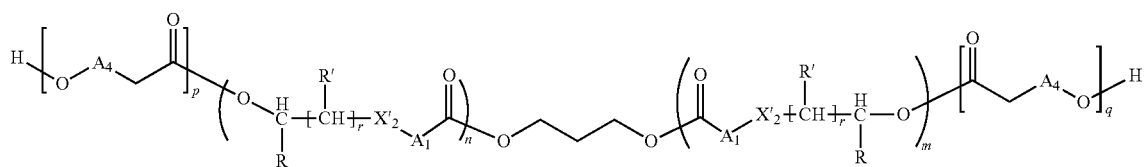
(III-2)

in which: $X'_2$, $A_1$, $A_4$, R, R', r, p, q, n and m are as previously defined above.

According to the invention, the compounds having the formula (III-2) correspond to compounds having the formula (III) wherein $X_1$, $X_3$ and $X_4$ represent O, $A_1$ represents —CH(R)—[CH(R')]$_r$—, and $A_3$ represents —(CH$_2$)$_3$—.

The compounds having the formulas (III-2) that are preferred are those for which, R represents —(CH$_2$)$_5$CH$_3$, r represents 0, $X'_2$ represents CH$_2$, $A_1$ represents —CH=CH—(CH$_2$)$_7$—.

The compounds having the formulas (III-2) that are preferred are those for which, R represents H, r represents 1, R' represents H, $X'_2$ represents S, $A_1$ represents —CH[(CH$_2$)$_7$CH$_3$]—(CH$_2$)$_8$—.

The compounds having the formulas (III-2) that are preferred are those for which, R represents H, r represents 1, Rc represents OMe, $X'_2$ represents —CH$_2$—, $A_1$ represents —(CH$_2$)$_7$—.

The compounds having the formulas (III-2) that are preferred are those for which, R represents H, r represents 1, R' represents H, $X'_2$ represents S, $A_1$ is —(CH$_2$)$_{10}$—.

The compounds having the following formulas (III-2) that are preferred are those for which, R represents —(CH$_2$)$_7$CH$_3$, r represents 1, R' represents OMe, $X'_2$ represents —CH$_2$— and $A_1$ represents —(CH$_2$)$_6$—.

The compounds having the following formulas (III-2) that are preferred are those for which, R represents —CH$_2$OMe, r represents 0, $X'_2$ represents —CH$_2$— and $A_1$ represents —(CH$_2$)$_7$—.

The compounds having the formulas (III-2) that are preferred are those for which, R represents —CH[CH(OMe)(CH$_2$)$_7$CH$_3$], r represents 0, $X'_2$ represents —CH$_2$— and $A_1$ represents —(CH$_2$)$_6$—.

The present invention also relates to a method for preparation of compounds having the general formula (III) indicated above, including a step of ring opening polymerisation of a compound having the following formula (VIII) with a compound having the formula (I) as defined here above:

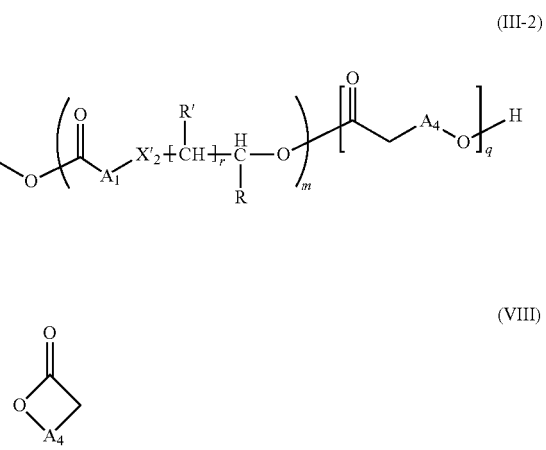
(VIII)

in which: $A_4$ represents a divalent alkylene radical, which is linear or branched, comprising from 2 to 20 carbon atoms, preferably from 2 to 12, with the said radical possibly comprising at least one unsaturation.

According to the invention, the method for preparation of compounds having the formula (III) may be carried out in the presence of a catalyst, in particular selected from the group consisting of: stannous octoate (or tin octoate) (Sn(Oct)$_2$), Ti(BuO)$_4$, Ti(iPrO)$_4$, Zn(Ac)$_2$, TBD and N-heterocyclic carbenes. Preferably, the catalyst used is stannous octoate (Sn(Oct)$_2$).

According to one embodiment, the catalyst is used in the mole percent concentration of 10 mol % to 70 mol % relative to the compound having the formula (I). Preferably from 25 mol % to 60 mol % of catalyst is used, and preferentially 50 mol %.

According to one embodiment, a solution of a compound (I) in a solvent such as toluene, benzene or xylene, is added into a solution of a compound (VIII) in a solvent such as toluene, benzene or xylene. Preferably a solution of a compound (I) in toluene is added to a solution of a compound (VIII) in toluene.

According to the invention, the polymerisation reaction may be carried out at a temperature ranging from 60° C. to 150° C., preferably from 90° C. to 150° C. In particular, the reaction is carried out at 140° C. under reflux conditions.

Preferably, the reaction is carried out over a period of 4 hours.

According to the invention, the abovementioned polymerisation reaction corresponds to a ring opening polymerisation of the compound having the formula (VIII), initiated by the terminal functional groups of the compound having the formula (I) indicated above.

According to the invention, the compounds having the formula (III) may correspond to block copolymers, and in particular triblock copolymers having one central block and two lateral blocks.

According the invention, the triblock copolymers may include a central block corresponding in particular to:

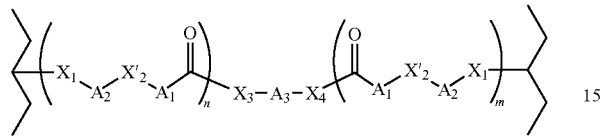

and lateral blocks on each side of the central block corresponding to:

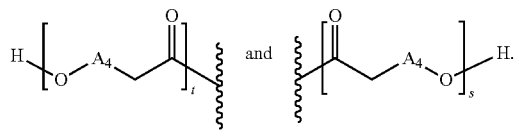

According to the invention, the central block may be derived from compounds having the formula (I), whereas the lateral blocks may be derived from compounds having the formula (VIII).

According to the invention, the size of the lateral blocks may depend on the molar ratio of the compound having the formula (VIII)/the compound having the formula (I). Thus, by causing the varying of the amount of material of the compound having the formula (VIII) indicated above in relation to the amount of material of the compound having the formula (I), it is possible to obtain triblock copolymers having the formula (III) for various different compositions.

According to one embodiment, the higher the value of this ratio, the higher will be the value of t and/or s.

According to one embodiment, the molar ratio of the compound having the formula (VIII)/the compound having the formula (I) ranges from 500:1 to 50:1, preferably from 450:1 to 70:1.

According to one embodiment, the weight percentage of the aforementioned lateral blocks in the compounds having the formula (III) amounts to 40% by weight, preferably 50% by weight, preferably 70% by weight, and more preferably 80% by weight, relative to the total weight of the compound having the formula (III)

The present invention also relates to compounds having the following formula (IV):

in which:

$X_1$, $X_3$, $X'_2$, $X_4$, $A_1$, $A_2$, $A_3$, n and m are as previously defined above;

$A_5$ is selected from the group consisting of:

an alkylene radical, which is linear or branched, comprising from 1 to 20 carbon atoms, preferably from 2 to 12, the said radical possibly comprising at least one unsaturation;

an arylene radical, comprising from 6 to 20 carbon atoms, preferably from 6 to 12, the said arylene radical being possibly substituted;

a cycloalkylene radical, comprising from 3 to 20 carbon atoms, preferably from 5 to 10, the said cycloalkylene radical being possibly substituted;

a cycloalkylene-alkylene-cycloalkylene radical, comprising from 6 to 30 carbon atoms;

an alkylene-cycloalkylene radical comprising from 4 to 15 carbon atoms;

v represents an integer ranging from 1 to 5000, preferably from 1 to 1000, and preferentially from 2 to 500.

According to one embodiment, the present invention relates to a method for preparation of compounds having the general formula (IV) as defined here above, the said method consisting of a polymerisation reaction of a compound having the formula (I) as previously defined above, with a compound having the following formula (IX):

$$O=C=N-A_5-N=C=O \qquad (IX)$$

in which $A_5$ is selected from the group consisting of:

an alkylene radical, which is linear or branched, comprising from 1 to 20 carbon atoms, preferably from 2 to 12, the said radical possibly comprising at least one unsaturation;

an arylene radical, comprising from 6 to 20 carbon atoms, preferably from 6 to 12, the said arylene radical being possibly substituted;

a cycloalkylene radical, comprising from 3 to 20 carbon atoms, preferably from 5 to 10, the said cycloalkylene radical being possibly substituted;

a cycloalkylene-alkylene-cycloalkylene radical, comprising from 6 to 30 carbon atoms;

an alkylene-cycloalkylene radical comprising from 4 to 15 carbon atoms.

The present invention also relates to compounds having the following formula (V):

(IV)

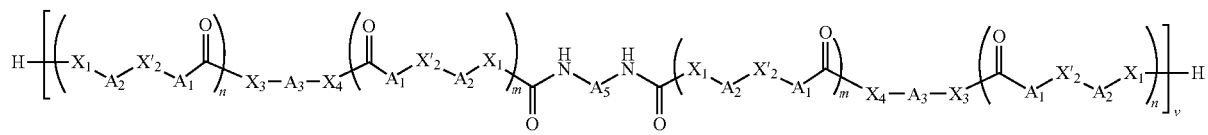

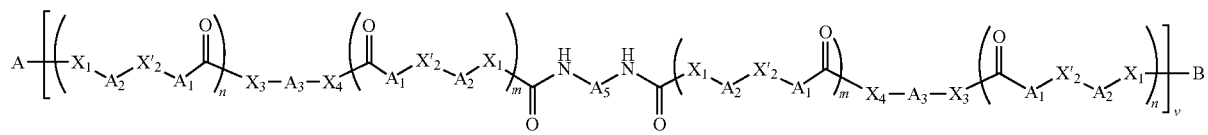

in which:
X$_1$, X'$_2$, X$_3$, X$_4$, A$_1$, A$_2$, A$_3$, A$_5$, n, v and m are as previously defined above;
A and B represent the following radicals:

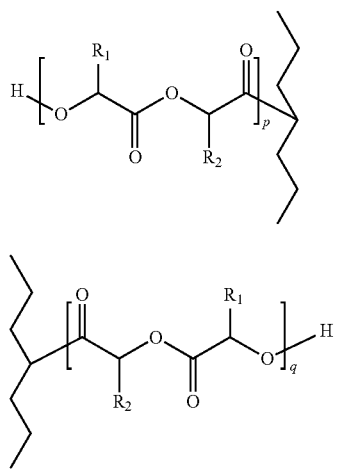

in which: R$_1$, R$_2$, p and q are as previously defined above.

According to one embodiment, the present invention also relates to a method for preparation of compounds having the general formula (V) indicated above, the said method consisting of a polymerisation reaction of a compound having the formula (IV) as previously defined above, with a compound having the following formula (VII):

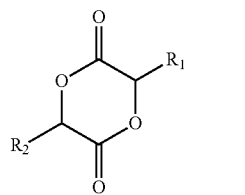

(VII)

in which R$_1$ and R$_2$ represent, independently of one another, H or an alkyl group, which is linear or branched, comprising from 1 to 20 carbon atoms, preferably from 2 to 12, and preferentially from 2 to 10, wherein the said alkyl group may possibly comprise at least one double bond.

According to the invention, the method for preparation of the compounds having the formula (V) may be carried out in the presence of a catalyst, in particular selected from the group consisting of: stannous octoate (or tin octoate) (Sn(Oct)$_2$), Ti(BuO)$_4$, Ti(iPrO)$_4$, Zn(Ac)$_2$, TBD and N-heterocyclic carbenes. Preferably, the catalyst used is stannous octoate (Sn(Oct)$_2$).

According to one embodiment, the catalyst is used in the mole percent concentration of 10 mol % to 70 mol % relative to the compound having the formula (IV). Preferably from 25 mol % to 60 mol % of catalyst is used, and preferentially 50 mol %.

According to one embodiment, a solution of a compound (IV) in a solvent such as toluene, benzene or xylene, is added into a solution of a compound (VII) in a solvent such as toluene, benzene or xylene. Preferably a solution of a compound (IV) in toluene is added to a solution of a compound (VII) in toluene.

According to the invention, the polymerisation reaction may be carried out at a temperature ranging from 60° C. to 150° C., preferably from 90° C. to 150° C. In particular, the reaction is carried out at 140° C. under reflux conditions.

Preferably, the reaction is carried out over a period of 4 hours.

According to one embodiment, in the formula (VII), R$_1$ represents a methyl group, and preferentially a levorotatory methyl group.

According to one embodiment, in the formula (VII), R$_2$ represents a methyl group, and preferentially a levorotatory methyl group.

According to the invention, the abovementioned polymerisation reaction corresponds to a ring opening polymerisation of the compound having the formula (VII), initiated by the terminal functional groups of the compound having the formula (IV) indicated above.

According to the invention, the compounds having the formula (V) may correspond to block copolymers, and in particular triblock copolymers having one central block and two lateral blocks.

According to the invention, the triblock copolymers having the formula (V) may include a central block corresponding in particular to:

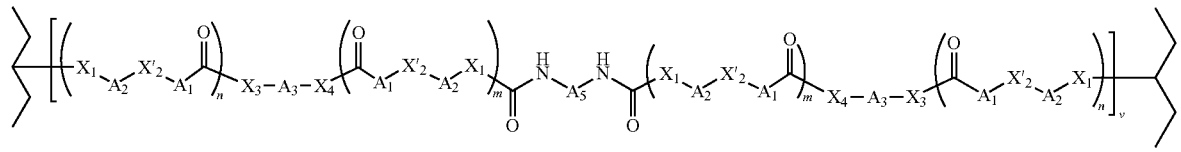

and lateral blocks on each side of the central block corresponding to:

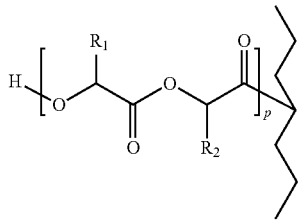

A

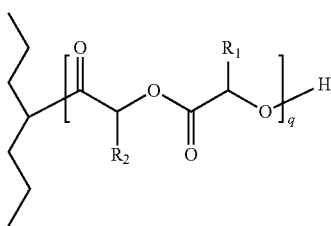

B

According to the invention, the central block may be derived from compounds having the formula (IV), whereas the lateral blocks may be derived from compounds having the formula (VII).

According to the invention, the size of the lateral blocks may depend on the molar ratio of the compound having the formula (VII)/the compound having the formula (IV). Thus, by causing the varying of the amount of material of the compound having the formula (VII) indicated above in relation to the amount of material of the compound having the formula (I), it is possible to obtain triblock copolymers having the formula (V) for various different compositions.

According to one embodiment, the higher the value of this ratio, the higher will be the value of p and/or q.

According to one embodiment, the molar ratio of the compound having the formula (VII)/the compound having the formula (IV) ranges from 500:1 to 50:1, preferably from 450:1 to 70:1.

According to one embodiment, the weight percentage of the aforementioned lateral blocks in the compounds having the formula (V) amounts to 40% by weight, preferably 50% by weight, preferably 70% by weight, and more preferably 80% by weight, relative to the total weight of the compound having the formula (V).

According to another object, the present invention also relates to the compounds having the following formula (VI):

in which: $X_1$, $X'_2$, $X_3$, $X_4$, $A_1$, $A_2$, $A_3$, $A_5$, D, E, $A_4$, t, s, n, v and m are as previously defined above.

According to one embodiment, the present invention relates to a method for preparation of compounds having the general formula (VI) indicated above, the said method consisting of a polymerisation reaction of a compound having the formula (IV) as previously defined above, with a compound having the following formula (VIII):

(VIII)

in which $A_4$ represents a divalent alkylene radical, which is linear or branched, comprising from 2 to 20 carbon atoms, preferably from 2 to 12, the said radical possibly comprising at least one unsaturation.

According to the invention, the method for preparation of the compounds having the formula (VI) may be carried out in the presence of a catalyst, in particular selected from the group consisting of: stannous octoate (or tin octoate) (Sn(Oct)$_2$), Ti(BuO)$_4$, Ti(iPrO)$_4$, Zn(Ac)$_2$, TBD and N-heterocyclic carbenes. Preferably, the catalyst used is stannous octoate (Sn(Oct)$_2$).

According to one embodiment, the catalyst is used in the mole percent concentration of 10 mol % to 70 mol % relative to the compound having the formula (IV). Preferably from 25 mol % to 60 mol % of catalyst is used, and preferentially 50 mol %.

According to one embodiment, a solution of a compound (IV) in a solvent such as toluene, benzene or xylene, is added into a solution of a compound (VIII) in a solvent such as toluene, benzene or xylene. Preferably a solution of a compound (IV) in toluene is added to a solution of a compound (VIII) in toluene.

According to the invention, the polymerisation reaction may be carried out at a temperature ranging from 60° C. to 150° C., preferably from 90° C. to 150° C. In particular, the reaction is carried out at 140° C. under reflux conditions.

Preferably, the reaction is carried out over a period of 4 hours.

According to the invention, the abovementioned polymerisation reaction corresponds to a ring opening polymerisation of the compound having the formula (VIII), initiated by the terminal functional groups of the compound having the formula (IV) indicated above.

According to the invention, the compounds having the formula (VI) may correspond to block copolymers, in particular triblock copolymers having one central block and two lateral blocks.

According the invention, the triblock copolymers having the formula (VI) may include a central block corresponding in particular to:

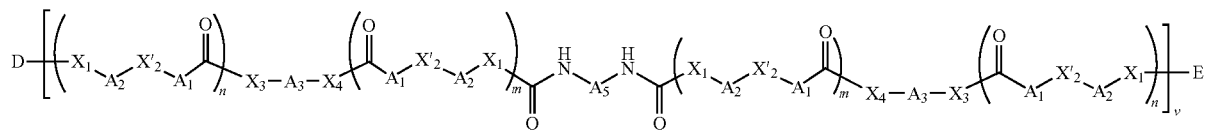

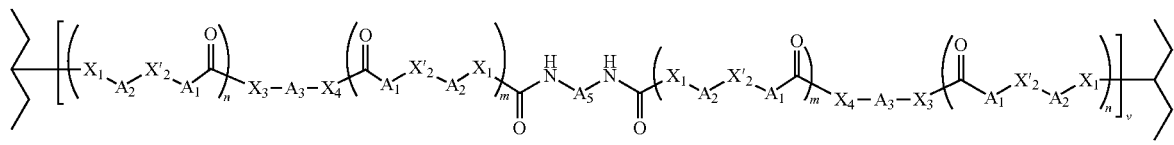

and lateral blocks on each side of the central block corresponding to:

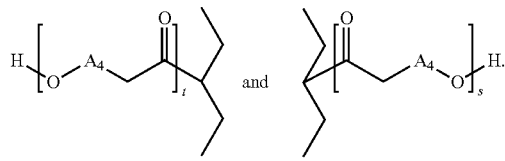

According to the invention, the central block may be derived from compounds having the formula (IV), whereas the lateral blocks may be derived from compounds having the formula (VIII).

According to the invention, the size of the lateral blocks may depend on the molar ratio of the compound having the formula (VIII)/the compound having the formula (IV). Thus, by causing the varying of the amount of material of the compound having the formula (VIII) indicated above in relation to the amount of material of the compound having the formula (IV), it is possible to obtain triblock copolymers having the formula (VI) for various different compositions.

According to one embodiment, the higher the value of this ratio, the higher will be the value of t and/or s.

According to one embodiment, the molar ratio of the compound having the formula (VIII)/the compound having the formula (IV) ranges from 500:1 to 50:1, preferably from 450:1 to 70:1.

According to one embodiment, the weight percentage of the aforementioned lateral blocks in the compounds having the formula (VI) amounts to 40% by weight, preferably 50% by weight, preferably 70% by weight, and more preferably 80% by weight, relative to the total weight of the compound having the formula (VI).

The present invention also relates to a composition comprising a matrix of polyester, poly(vinyl chloride), polyurethane, polyamide, poly(alkyl acrylate), poly(alkyl methacrylate), polystyrene or polyolefin, and at least one compound having the formulas (II), (III), (IV), (V) or (VI) or mixtures thereof, and possibly at least one other polymer, in particular selected from among poly(butadiene), poly(isoprene), poly(ε-caprolactone), poly(tetrahydrofuran) and poly(ricinoleic acid).

According to one embodiment, the invention relates to compositions comprising from 0% to 40% by weight, preferably from 5% to 20% by weight of a polymer selected from among poly(butadiene), poly(isoprene), poly(ε-caprolactone), poly(tetrahydrofuran) and poly(ricinoleic acid) in the matrix of polyester, poly(vinyl chloride), polyurethane, polyamide, poly(alkyl acrylate), poly(alkyl methacrylate), polystyrene or polyolefin, relative to the total weight of the composition.

According to one embodiment, the invention relates to compositions comprising from 60% to 95% by weight, preferably from 80% to 90%, matrix of polyester, poly(vinyl chloride), polyurethane, polyamide, poly(alkyl acrylate), poly(alkyl methacrylate), polystyrene or polyolefin, According to one embodiment, the invention relates to compositions comprising from 2% to 40% by weight, preferably from 5% to 20% by weight of compound having the formula (II), (III), (IV), (V) or (VI), relative to the total weight of the composition.

According to one embodiment, the invention relates to compositions comprising 90% by weight of a matrix of polyester, poly(vinyl chloride), polyurethane, polyamide, poly(alkyl acrylate), poly(alkyl methacrylate), polystyrene or polyolefin, preferably of poly(lactic acid), 5% by weight of a compound having the formulas (II), (III), (IV), (V) or (VI), and 5% by weight of another polymer in particular selected from among poly(butadiene), poly(isoprene), poly(ε-caprolactone), poly(tetrahydrofuran) and poly(ricinoleic acid).

According to one embodiment, the invention relates to compositions comprising 80% by weight of a matrix of polyester, poly(vinyl chloride), polyurethane, polyamide, poly(alkyl acrylate), poly(alkyl methacrylate), polystyrene or polyolefin, preferably of poly(lactic acid), 10% by weight of a compound having the formulas (II), (III), (IV), (V) or (VI), and 10% by weight of another polymer in particular selected from among poly(butadiene), poly(isoprene), poly(ε-caprolactone)., poly(tetrahydrofuran) and poly(ricinoleic acid).

According to one embodiment, the invention relates to a composition comprising a matrix of poly(lactic acid), and at least one compound corresponding to one of the formulas (II), (III), (IV), (V) or (VI) or mixtures thereof.

It is known that the brittleness of a polymer may be limited by dispersion of a flexible polymer in the matrix of the polymer to be enhanced. However, it is known from the state of the art that the incompatibility of the dispersed phase and the dispersing phase (matrix) most often leads to a phase segregation on a macroscopic scale which eventually deteriorates the mechanical properties of the mixture over the course of time.

Thus, it has been shown that the use of at least one compound having the formula (II), (III), (IV), (V) or (VI), or mixtures thereof, in a polymer matrix possibly comprising a flexible polymer, advantageously makes it possible to enhance the reinforcement against shocks of the said polymer matrix without problems of incompatibility, and in particular without phase segregation related problems as observed in the absence of the compounds according to the invention. Thus, the flexible polymers are advantageously compatible with the central block of the triblock additives according to the invention, while the external blocks of the additives according to the invention are advantageously compatible with the matrix, which provides for a stabilisation of the interface between the matrix and the flexible polymer.

According to another object, the present invention relates to the use of compounds having the formulas (V) and (VI) for the preparation of adhesives, surfactants, films, thermoplastic elastomers, paints or fibres.

The description in the present patent application has cast light on the preparation of pre-polymers (compounds (IA) and (I)) that are advantageously biobased and having controlled functionality.

The description has also shown the use thereof for the preparation of additives (compounds having the formulas (II) to (VI)) in a polymer matrix, and in particular in a matrix of poly(lactic-acid), with the said additives (compounds having the formulas (II) to (VI)) being advantageously derived from bioresources.

The use of compounds having the formulas (II) to (VI) advantageously makes it possible to enhance the reinforcement against shocks of a polymer matrix of polyester, poly(vinyl chloride), polyurethane, polyamide, poly(alkyl acrylate), poly(alkyl methacrylate), polystyrene or polyolefin, without affecting the other mechanical properties of the polymer of the said matrix. More particularly, the use of compounds having the formulas (II) to (VI) according to the invention advantageously provides the ability to increase the elongation at break of the polymer of the said matrix, and thus enables the possibility of making the polymer less brittle and/or of improving its hot and/or cold deformation capacity. These properties are due in particular to the presence of a block based on the compounds having the following formula (I) in the structure of the compounds having the formulas (II) to (VI), which advantageously has a low glass transition temperature.

In addition, the use of compounds having the formulas (II) to (VI) as additives to a polymer matrix of polyester, poly(vinyl chloride), polyurethane, polyamide, poly(alkyl acrylate), poly(alkyl methacrylate), polystyrene or polyolefin, advantageously makes it possible to assist in the nanostructuring of the polymer of the said matrix, and in particular in the crystallisation of the said polymer.

It has been shown that the use of pre-polymers having the formula (I) for the preparation of additives is of beneficial interest, in so far as the said pre-polymers have a low glass transition temperature, in particular ranging between −90° C. and −30° C.

In particular, it is known that PLA is easily breakable. Thus, the use of compounds having the formulas (II) to (VI), and in particular use of triblock copolymers, according to the invention advantageously provides the ability to enhance the reinforcement against shocks of PLA, and thereby make it less brittle. In fact, the incorporation of compounds having the formula (I) presenting a low $T_g$, and in particular incorporation of poly(ricinoleic acid), in triblock copolymers, advantageously provides the ability to significantly reduce the brittleness of PLA. Thus, the PLA breaks at elongations that are far higher than without the use of compounds having the formulas (II) to (VII) according to the invention.

In addition, the reinforcement against shocks of a matrix of polyester, poly(vinyl chloride), polyurethane, polyamide, poly(alkyl acrylate), poly(alkyl methacrylate), polystyrene or polyolefin, and in particular of PLA, as well as the assistance in the nanostructuring process have advantageously been observed without problems of incompatibility between the matrix and the additives, in contrast to what is typically observed with the polymers described in the state of the art.

The following examples are used to illustrate the present invention without however in any way limiting the same.

EXAMPLES

FIG. 1: Tapping mode AFM (atomic force microscopy) images of the samples after rapid evaporation of dichloromethane. (a) copolymer D (b) copolymer C (c) copolymer B (d) copolymer A.

Figure 2:
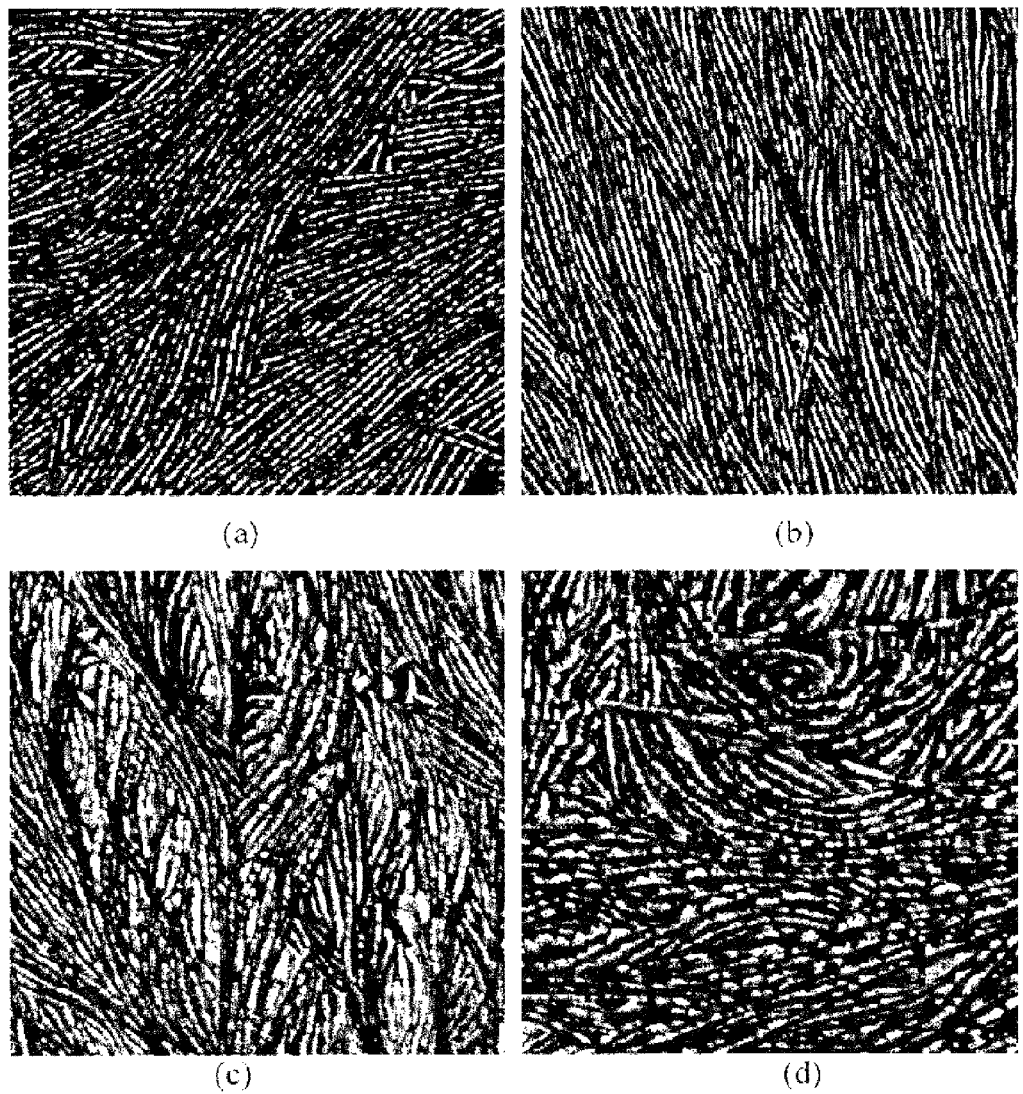

FIG. 2: Tapping mode AFM images of the samples after annealing at 115° C. for 90 minutes. (a) copolymer of D; (b) copolymer C; (c) copolymer B; (d) copolymer A.

Figure 3:
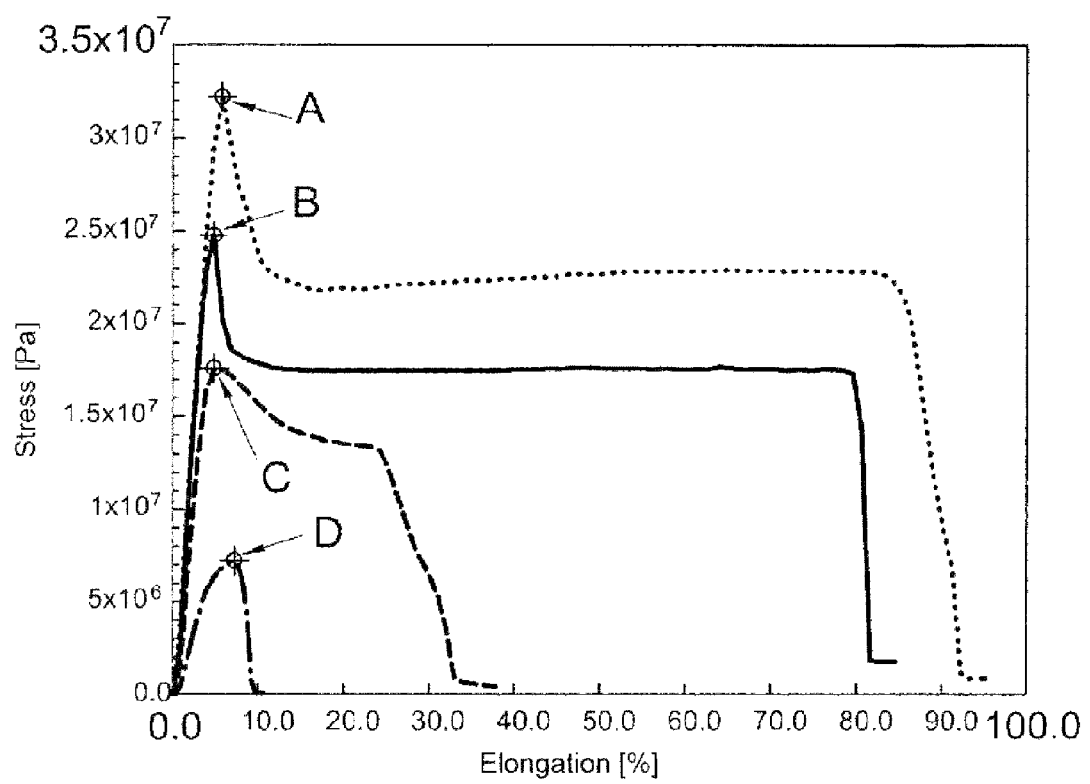

FIG. 3: Stress-Elongation Curves of the unannealed samples for a tensile speed of 1 mm/min.

SUPPLIERS

Methyl Ricinoleate 85%: ITERG (Institut des Corps Gras)
L-lactide>98%: TCI Chemicals
1,3-propanediol 99%: Alfa Aesar
Ti(OBu)$_4$ 99%: Sigma Aldrich
Stannous (Tin) Octoate 95% Sigma Aldrich

Example 1: Preparation of Triblock Copolymers of PLA-Polyricinoleate-PLA (5)

Step 1: Preparation of dihydroxy telechelic poly(methyl ricinoleate) (3)

The dihydroxy telechelic poly(methyl ricinoleate) (3) was synthesised by transesterification of methyl ricinoleate (1) in the presence of 1,3-propanediol as well as Ti(OBu)$_4$. The methyl ricinoleate (1) used had been previously purified by means of column chromatography by using as eluent a mixture of Heptane/Acetone (v/v: 98/2). The product (1), after purification, has a purity of 99% after analysis by means of gas chromatography.

In a 50 mL flask, 5 g of methyl ricinoleate (1), 73 mg of 1,3-propanediol (2) as well as 54 mg of Ti(OBu)$_4$ were introduced. The reaction mixture was allowed to remain under stirring at 140° C. for a period of 2 hours under a stream of N$_2$. The temperature was subsequently raised to 180° C. for a period of one hour and then the flask was placed under a dynamic vacuum for a period of 21 hours at 180° C. At the end of the reaction, the polymer was dissolved in dichloromethane and then precipitated in methanol and finally dried under reduced pressure until achieving stabilisation of the mass.

$^1$H-NMR (400 MHz, CDCl$_3$, δ): 0.87 (m, —CH$_2$—CH$_3$), 1.30 (m, —[CH$_2$]—), 1.56 (m,), 2.00 (m,), 2.26 (m,), 3.61 (m, —CH$_2$—CH—OH), 4.14 (t, —COO—CH$_2$—CH$_2$—), 4.88 (m, —CH$_2$—CH—OCO—), 5.33 (m, —CH$_2$—CH═CH—CH$_2$), 5.39 (m, —CH$_2$—CH═CH—CH$_2$), 5.44 (m, —CH$_2$—CH═CH—CH$_2$), 5.54 (m, —CH$_2$—CH═CH—CH$_2$).

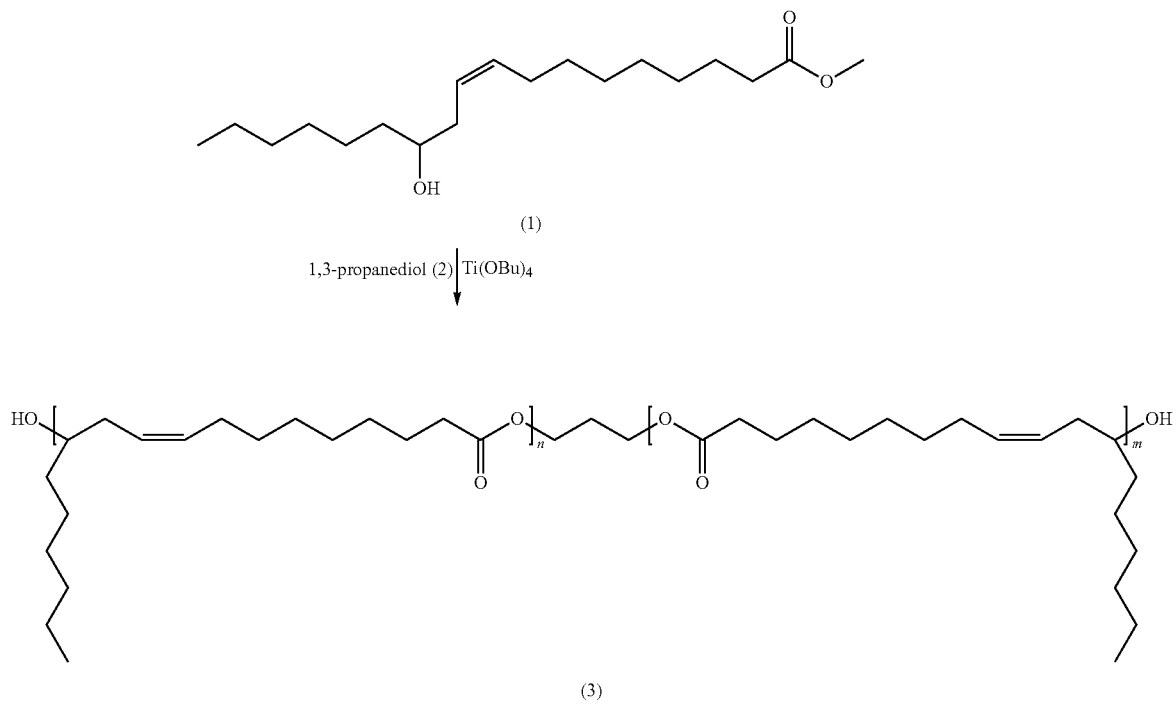

Step 2: Preparation of the Copolymer (5)

The L-lactide (4), which had been previously recrystallised in toluene, was introduced into a three necked flask and then dried under dynamic vacuum for a period of 12 hours. At the same time the compound (3) that had been previously prepared, was also dried under dynamic vacuum at 70° C. for a period of 12 hours. Some anhydrous toluene was then added to the flask containing the macro-initiator as well as in the flask containing the compound (4). The catalyst, tin octoate, was added to the solution of the compound (3) and then the mixture was allowed to remain under stirring for a period of 1 hour. This solution was then added to the solution of L-lactide (4) and the reaction mixture was stirred vigorously under reflux conditions at 140° C. for a period of 4 hours. The toluene was then removed under dynamic vacuum, and thereafter the polymer (5) was dissolved in dichloromethane, precipitated in methanol and then dried under reduced pressure.

$^1$H-NMR (400 MHz, CDCl$_3$, δ): 0.88 (m, —CH$_2$—CH$_3$), 1.30 (m, —[CH$_2$]—), 1.54 (m,), 2.00 (m,), 2.26 (m,), 4.14 (t, —COO—CH$_2$—CH$_2$—), 4.35 (m, OH—CH—(CH$_3$)—COO—) 4.88 (m, —CH$_2$—CH—OCO—), 5.17 (q, —CH—(CH$_3$)—COO—) 5.33 (m, —CH$_2$—CH=CH—CH$_2$), 5.39 (m, —CH$_2$—CH=CH—CH$_2$), 5.44 (m, —CH$_2$—CH=CH—CH$_2$), 5.54 (m, —CH$_2$—CH=CH—CH$_2$).

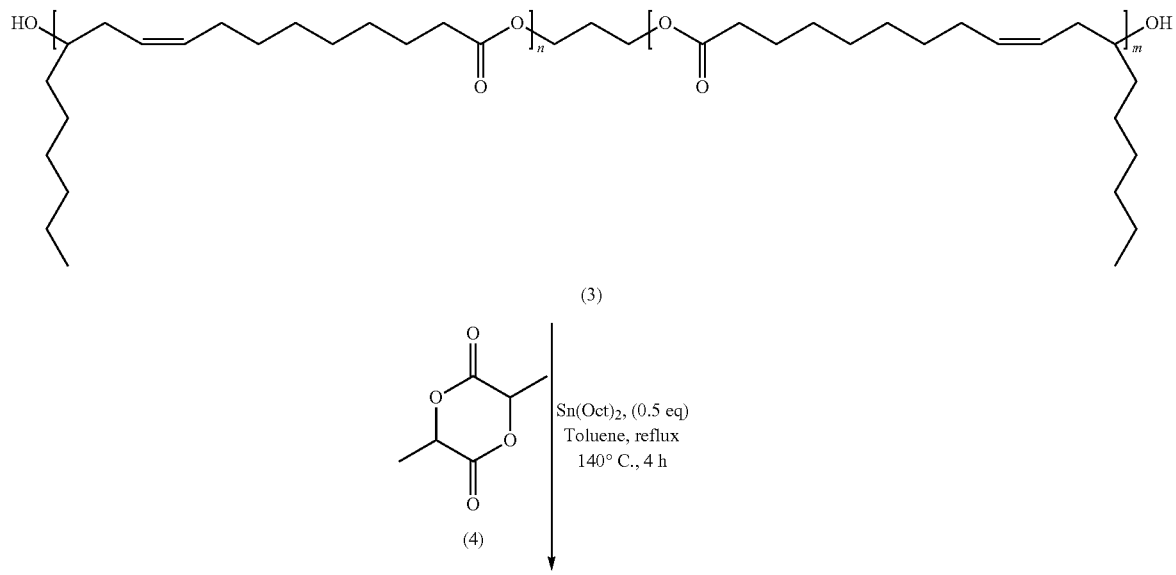

-continued

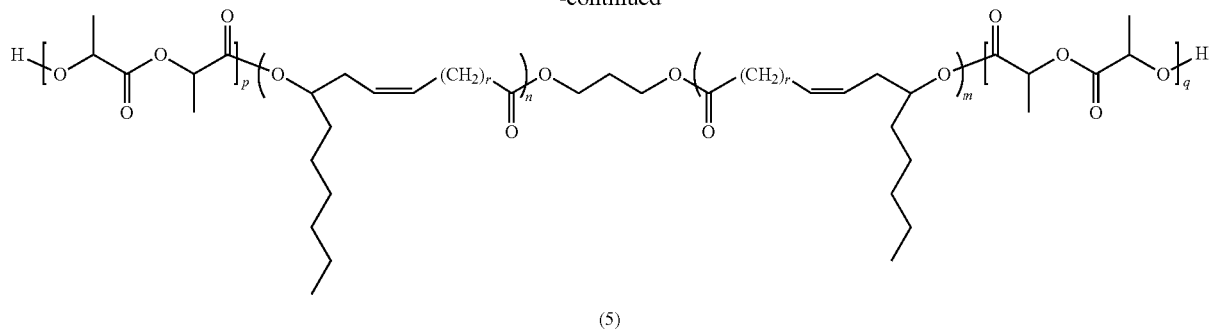

(5)

By causing the varying of the amount of material of L-lactide (4) relative to the compound (3), triblock copolymers of the various different compositions are obtained.

ibility of the PLA blocks (derived from the compound 4) and poly(methyl ricinoleate) blocks (derived from the compound 3). Thus depending on the composition of the copolymer,

TABLE 1

Characteristic Features of various different copolymers (5)

| Copolymer | $[(4)]_0/[(3)]_0$ | $W_{PLLA}$ theo | $W_{PLLA}{}^a$ | Conversion$^a$ (%) | Mn$^a$ (kg/mol) | PDI$^b$ | Tg(Pric)$^c$ (° C.) | Tg (PLA)$^c$ (° C.) | Tf (PLA)$^c$ (° C.) | ΔHf$^c$ (J/g) | Xc$^c$ (%) |
|---|---|---|---|---|---|---|---|---|---|---|---|
| A | 429/1 | 0.90 | 0.83 | 90 | 61 | 1.2 | −77 | 54 | 179 | 56 | 66 |
| B | 194/1 | 0.80 | 0.71 | 90 | 49 | 1.3 | −75 | 60 | 170 | 37 | 56 |
| C | 113/1 | 0.70 | 0.63 | 92 | 31 | 1.3 | −70 | 50 | 167 | 35 | 60 |
| D | 73/1 | 0.60 | 0.53 | 86 | 28 | 1.2 | −70 | 56 | 160 | 28 | 57 |

$^a$Determined by $^1$H NMR
$^b$Determined by SEC in THF, PS calibration
$^c$DSC, 10° C./min
$W_{PLLA}$: weight percentage of the PLLA blocks derived from the compound (4) in the copolymer;
Tg: glass transition temperature of the poly(methyl ricinoleate) or PLLA block in the copolymer;
Tf: melting point temperature of the PLLA blocks in the copolymer;
ΔHf: enthalpy effusion of the PLLA blocks in the copolymer;
Xc: degree of crystallinity of the PLLA blocks in the copolymer.

The triblock structure of the copolymers was confirmed by means of $^1$H NMR (Proton or Hydrogen-1 Nuclear Magnetic Resonance spectroscopy) and DSC (Differential Scanning Calorimetry). Indeed, by $^1$H NMR, the shift of the peaks of allylic protons of the terminal unit of the compound (3) comes to be found at 5.4 ppm. The disappearance of the peak at 3.55 ppm of the proton situated on the carbon bearing the hydroxyl functional group was also observed, which makes it possible to confirm that the initiation of the polymerisation of L-lactide (4) has indeed been achieved by the hydroxyl functional groups of the compound (3).

The analyses by way of DSC have also provided the means to confirm the "block" structure of the copolymers due to the presence of two Tg values, one at −70° C. corresponding to the poly(methyl ricinoleate) block (derived from the compound 3) and another at 50° C. corresponding to the two PLLA blocks (derived from the compound 4). Moreover, the melting point temperature of the triblock copolymer (5) is similar to that of PLA alone that is to say about 180° C. This also confirms the "block" structure of the copolymer. In fact a statistical distribution of ricinoleate units in the polymer would have led to a significant decrease in the melting temperature.

In the light of the above table, it has been found that the degree of crystallinity of the copolymers increases slightly with the size of the PLLA blocks.

An analysis of the films of the copolymers by means of AFM (Atomic Force Microscopy) has also made it possible to note a significant phase segregation due to the incompatvarious different morphologies may be obtained when the materials are not annealed (FIG. 1).

The block polymers were set to dissolve in dichloromethane and then deposited by spin coating on to silicon wafers. The films were then analysed by atomic force microscopy (AFM) and the images revealed nano-organisations in lamellae, cylinders or spheres based on the proportion between the different blocks.

However, when annealing of the material is brought about at 115° C. after passing into the molten state, the crystallisation of the PLA blocks brings about a disorganisation at the nano scale. One is then able to perceive the formation of spherulites wherein the internal structure is disrupted by the presence of the amorphous poly(methyl ricinoleate) block.

In the light of the AFM images obtained from the annealed films (FIG. 2), it appears that the crystallisation of PLA blocks forces the segregation of the amorphous poly (methyl ricinoleate) block in the interlamellar regions in the crystallised polymer. It is noted that there is a distinguishable increase in the size of the crystalline lamellae with an increase in the size of the PLA blocks in the structure of the copolymer. It is noted also that the crystallinity has an important effect on the orientation of the crystalline lamellae. Indeed, a large proportion of amorphous poly(methyl ricinoleate) block induces a very significant orientation of the lamellae in a direction in space while the increase in the size of the PLA blocks relative to poly(methyl ricinoleate) results in the formation of "terraces" that is characteristic of a high degree of crystallisation.

The structure of the spherulites was also studied by means of optical microscopy. An overall decrease in the diameter of spherulites is observed when the percentage of PLA is increased. This signifies that the seed crystals are more numerous and thus that the material possesses a greater degree of crystallinity.

Finally mechanical tests were carried out on the copolymer films (without annealing) in order to assess and measure the increase in the elongation at break generated by the presence of the poly(methyl ricinoleate) block (derived from the compound 3) being aware that the PLLA alone has an elongation at break of between 3% and 7%.

The copolymers having 17% and 29% of poly(ricinoleic acid) break for the respective elongations of 98% and 95%. It has thus been possible to validate this strategy aimed at limiting the brittleness of PLLA by incorporation of flexible segments having low Tg bymeans of the mechanical tests.

Example 2: Preparation of Polypropylene Glycol Polyricinoleate (7)

The methyl esters of castor oil (6) (1 eq.), polypropylene glycol (PPG) (0.1 to 0.2 eq.), the catalyst Ti(BuO)$_4$ were loaded into the reactor. The medium was heated slowly under vacuum until the point of achieving the desired operating conditions (T: 200° C., P: 6 to 20 mbar). The reaction mixture was maintained under these conditions for a period of 6 to 10 hours. At the end of reaction, the mixture was cooled and then the vacuum was broken so as to provide a clear orange product that was not subjected to any post-treatment process.

In which PPG corresponds to a radical derived from poly(propylene glycol) without any terminal functional groups.

TABLE 2

Various different polymers (7) in accordance with the operating conditions

|  | copolymer | | | |
| --- | --- | --- | --- | --- |
|  | 7a | 7b | 7c | 7d |
| catalyst (mol % of Ti(BuO)$_4$ relative to (6)) | 0.1 | 0.1 | 0.05 | 0.05 |
| molar ratio of PPG relative to (6) | 0.1 n | 0.2 n | 0.1 n | 0.2 n |
| Final T (° C.) | 200 | 200 | 200 | 200 |
| Final P (mbar) | 12 | 6 | 15 | 11 |
| Time (h) | 6 | 6 | 10 | 10 |
| IA (mg KOH/g)[a] | 0.14 | 0.11 | 0.12 | 0.11 |
| IOH (mg KOH/g)[b] | 28.7 | 59.7 | 40.7 | 59.3 |

[a]Acid number
[b]Hydroxyl number

Example 3: Preparation of Polyricinoleate of Pripol® (9)

The polyricinoleate was synthesised according to the operating procedure used in Example 2, and in accordance with the specific conditions detailed in Table 3 below.

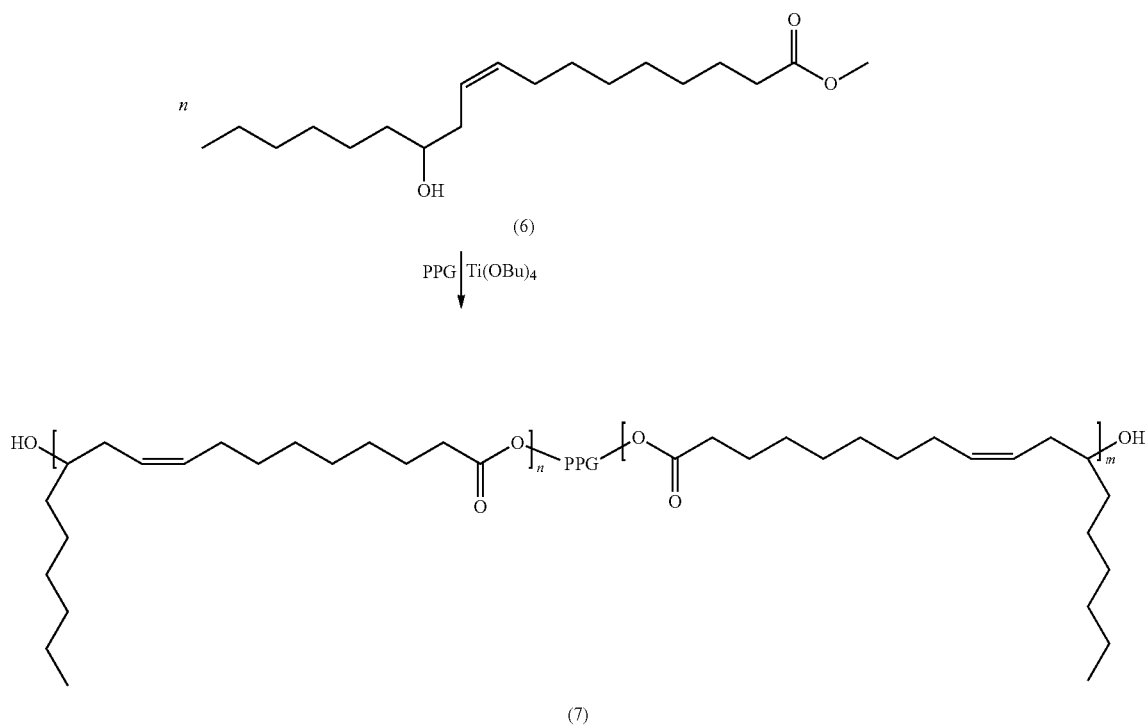

(6)

PPG | Ti(OBu)$_4$ (7)

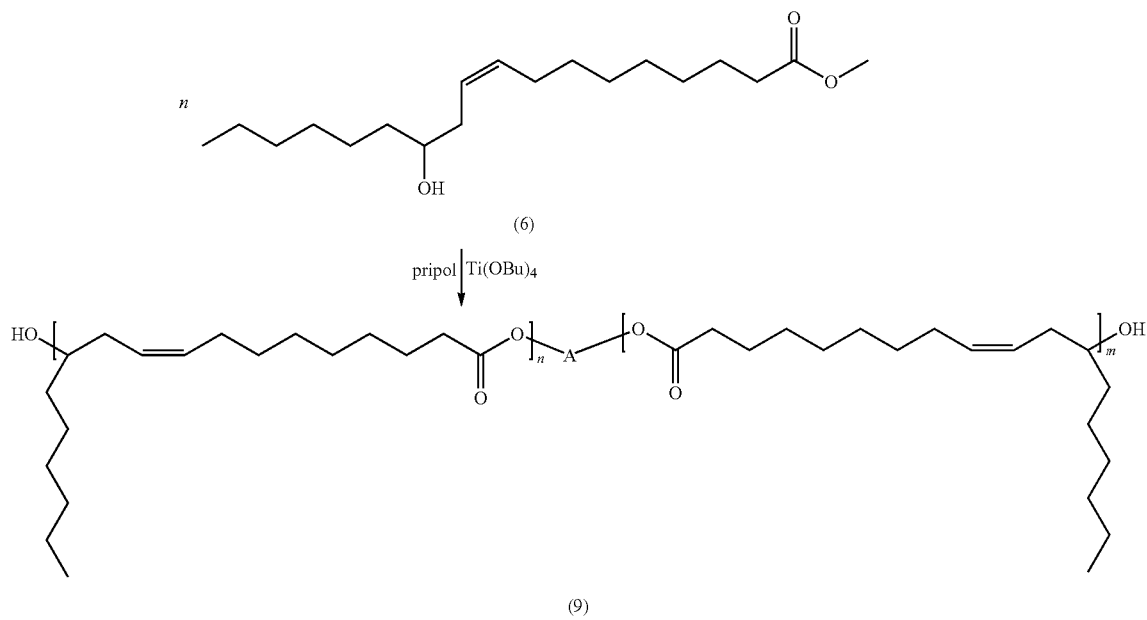

with A corresponding to the radical derived from Pripol without any terminal OH functional groups.

In particular, A represents the following group:

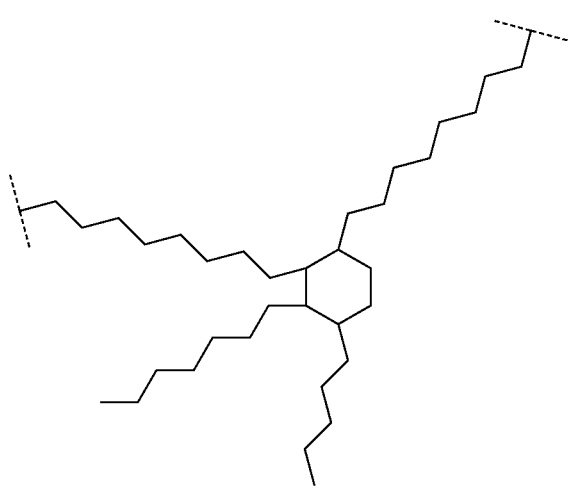

TABLE 3

Various different polymers (9) in accordance with the operating conditions

| | copolymer | | | |
|---|---|---|---|---|
| | 9a | 9b | 9c | 9d |
| catalyst (mol % of Ti(BuO)₄ relative to (6)) | 0.05 | 0.05 | 0.05 | 0.05 |
| molar ratio of PPG relative to (6) | 0.1 n | 0.2 n | 0.3 n | 0.4 n |
| Final T (° C.) | 200 | 200 | 200 | 200 |
| Final P (mbar) | 10 | 16 | 16 | 15 |
| Time (h) | 3 | 3 | 3 | 3 |
| IA (mg KOH/g)[a] | 0.22 | 0.48 | 0.60 | 0.44 |
| IOH (mg KOH/g)[b] | 26.8 | 63.1 | 76.9 | 91.0 |

[a]Acid number
[b]Hydroxyl number

Example 4: Study of Ternary Mixture

A ternary mixture of PLA/Poly(ricinoleic acid)/Triblock Copolymer (5) was prepared and studied.

Binary mixtures: PLA/Poly(ricinoleic acid) were also prepared by using a mini extruder. Tensile tests at a speed of 10 mm/min were first of all carried out on the binary mixtures by causing the varying of the percentage of poly (ricinoleic acid) in the mixture.

It was noted that the increase in the percentage of poly (ricinoleic acid) in the mixture results in a significant increase in the elongation at break. There was also instability observed in the binary mixture over the course of time.

It has been shown that a ternary mixture of PLA/Poly (ricinoleic acid)/Triblock Copolymer (5): 90-5-5 has an elongation at break of 190% while a binary mixture of PLA-PRic: 95-5 breaks at 25%. The presence of the copolymer at the interface seems thus to have a strong influence on the mechanical properties of the mixture.

What is claimed is:

1. A method for preparing additives selected from the group consisting of compounds having the following formulas (II), (III), (IV), (V) and (VI):

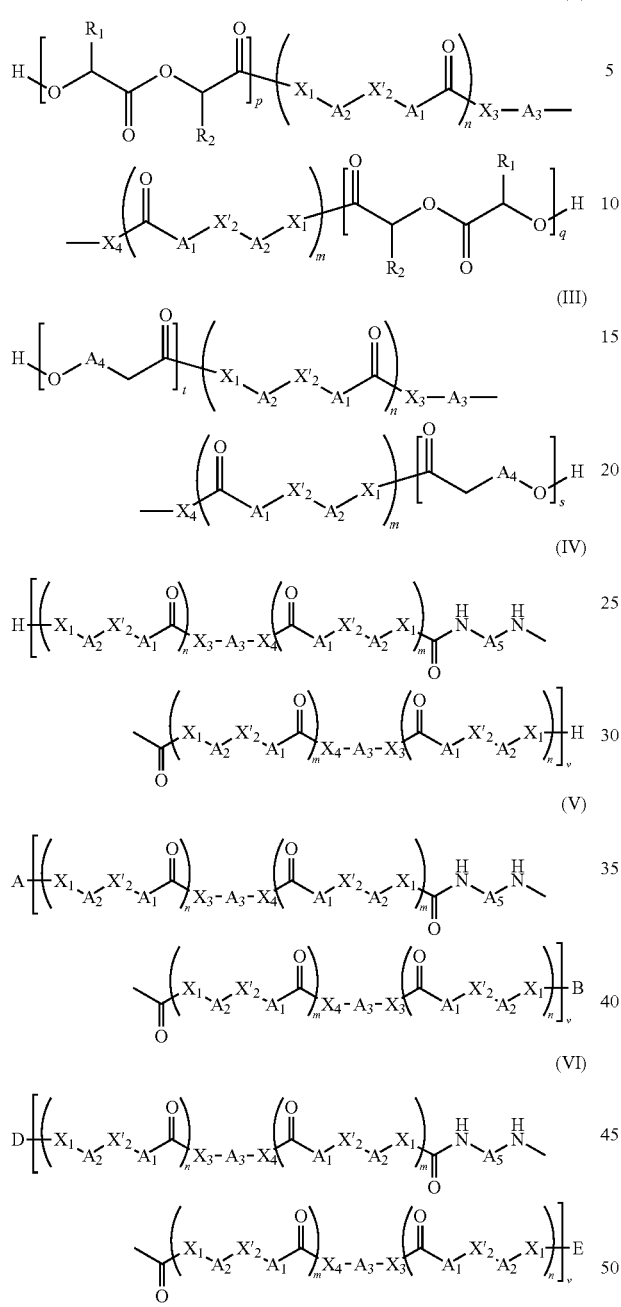

(II)

(III)

(IV)

(V)

(VI)

wherein:

$A_1$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;

$A_2$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;

$A_3$ is selected from the group consisting of the following divalent radicals:

a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and an arylene comprising from 6 to 30 carbon atoms, the said radical being possibly substituted by at least one substituent —OAlk, Alk representing an alkyl group comprising from 1 to 10 carbon atoms;

$X_1$, $X_3$ and $X_4$, which may be identical or different, represent, independently of one another, —O— or —NH—;

$X'_2$ is selected from the group consisting of: —S—, —CH$_2$— and a bond; and n and m represent, independently of one another, an integer ranging from 1 to 1000;

on the condition that the total number of carbon atoms of the radicals $A_1$, $A_2$ and $X'_2$ is greater than or equal to 8;

$R_1$ and $R_2$ represent, independently of one another, H or an alkyl group, which is linear or branched, comprising from 1 to 20 carbon atoms, wherein the said alkyl group may possibly comprise at least one double bond or one triple bond;

$A_4$ represents a divalent alkylene radical, which is linear or branched, comprising from 1 to 20 carbon atoms, the said radical possibly comprising at least one unsaturation;

$A_5$ is selected from the group consisting of the radicals:

alkylene, which is linear or branched, comprising from 1 to 20 carbon atoms, the said radical possibly comprising at least one unsaturation;

arylene, comprising from 6 to 20 carbon atoms, the said arylene radical being possibly substituted;

cycloalkylene, comprising from 3 to 20 carbon atoms, the said cycloalkylene radical being possibly substituted;

cycloalkylene-alkylene-cycloalkylene comprising from 6 to 30 carbon atoms; and alkylene-cycloalkylene comprising from 4 to 15 carbon atoms;

v represents an integer ranging from 1 to 5000;

A and B represent the following radicals:

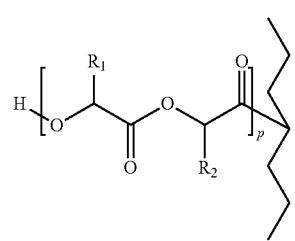

A

-continued

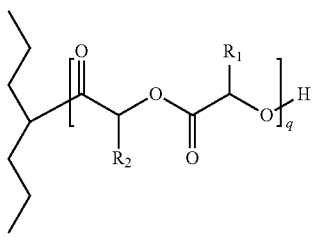
B

D and E represent the following radicals:

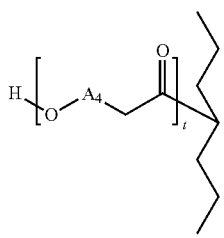
D

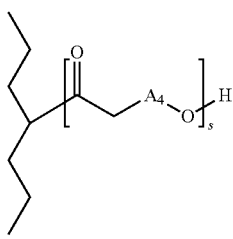
E p and q represent, independently of one another, an integer ranging from 1 to 5000;
t and s represent, independently of one another, an integer ranging from 1 to 5000;
from a compound having the following formula (I):

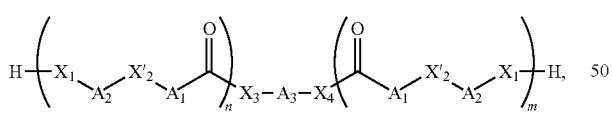
(I)

wherein the additives are obtained by a polymerization step using the compound of formula I.

2. The method according to claim 1, wherein the additives enhance the reinforcement against shocks of a matrix of polyester, poly(vinyl chloride), polyurethane, polyamide, poly(alkyl acrylate), poly(alkyl methacrylate), polystyrene or polyolefin, and/or to assist in the nanostructuring of the said matrix.

3. Compounds having the following formula (IA):

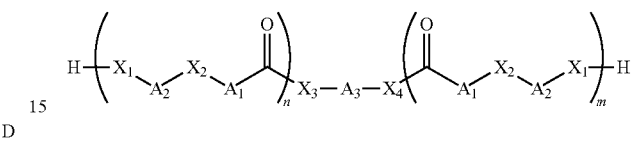
(IA)

wherein:
$A_1$ represents a divalent alkylene radical, which is linear or branched, wherein the number of carbon atoms is greater than or equal to 10, the said radical possibly comprising one or more unsaturations, and being possibly substituted by at least one substituent —OAlk, Alk representing an alkyl group comprising from 1 to 10 carbon atoms;
$A_2$ represents a divalent alkylene radical, which is linear or branched, wherein the number of carbon atoms is greater than or equal to 10, the said radical possibly comprising one or more unsaturations, and being possibly substituted by at least one substituent —OAlk, Alk representing an alkyl group comprising from 1 to 10 carbon atoms;
$A_3$ is selected from the group consisting of the following divalent radicals:
a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
an arylene comprising from 6 to 30 carbon atoms, the said radical being possibly substituted by at least one substituent —OAlk, Alk representing an alkyl group comprising from 1 to 10 carbon atoms;
$X_1$, $X_3$ and $X_4$, which may be identical or different, represent, independently of one another, —O— or —NH—;
n and m represent, independently of one another, an integer ranging from 1 to 1000;
$X_2$ represents —$CH_2$— or a bond; and
on the condition that the total number of carbon atoms of the radicals $A_1$, $A_2$ and $X_2$ is greater than or equal to 10;
with the exception of the following compounds:

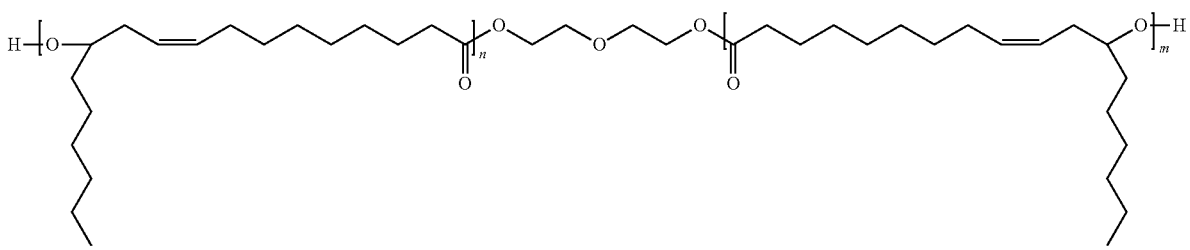

-continued

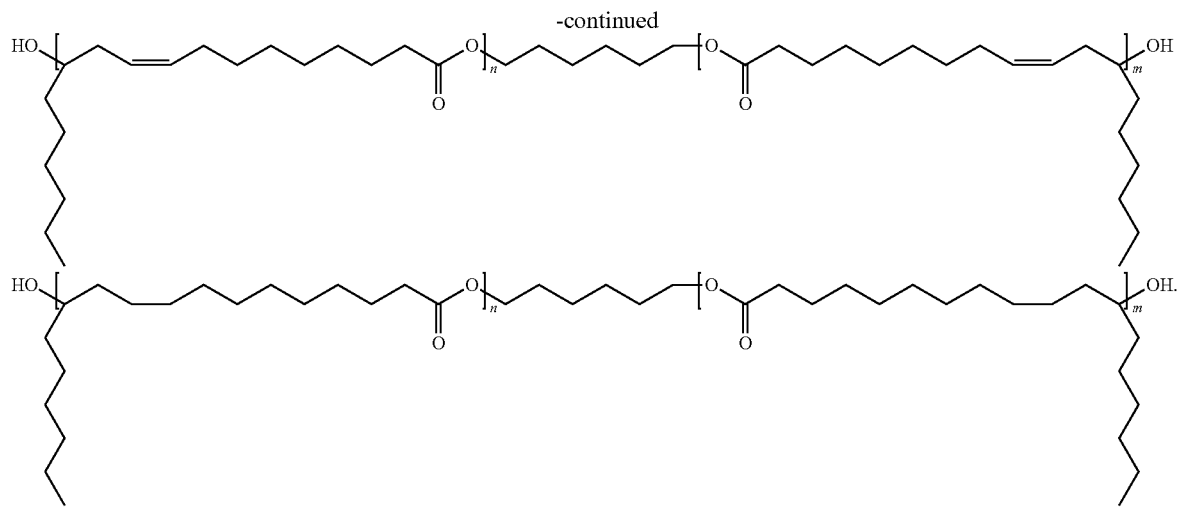

4. A compound having the following formula (II):

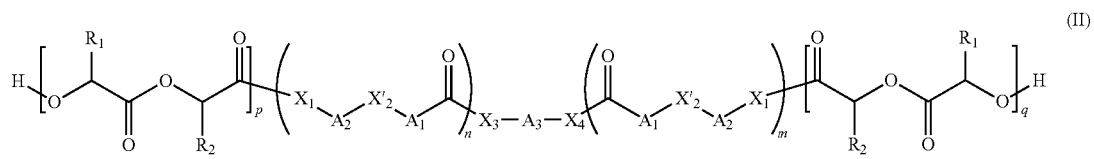

wherein:
  $A_1$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
  $A_2$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
  $A_3$ is selected from the group consisting of the following divalent radicals:
    a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
    an arylene comprising from 6 to 30 carbon atoms, the said radical being possibly substituted by at least one substituent —OAlk, Alk representing an alkyl group comprising from 1 to 10 carbon atoms;
  $X_1$, $X_3$ and $X_4$, which may be identical or different, represent, independently of one another, —O— or —NH—;
  $X'_2$ is selected from the group consisting of: —S—, —CH$_2$— and a bond;
on the condition that the total number of carbon atoms of the radicals $A_1$, $A_2$ and $X'_2$ is greater than or equal to 8;
  n and m represent, independently of one another, an integer ranging from 1 to 1000;
  $R_1$ and $R_2$ represent, independently of one another, H or an alkyl group, which is linear or branched, comprising from 1 to 20 carbon atoms, wherein the said alkyl group may possibly comprise at least one double bond or one triple bond; and
  p and q represent, independently of one another, an integer ranging from 1 to 5000.

5. A compound having the following formula (III):

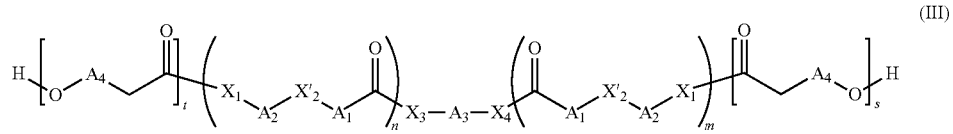

wherein:
  $A_1$ represents a divalent alkylene radical, which is linear or branched, wherein the number of carbon atoms is greater than or equal to 10, the said radical possibly comprising one or more unsaturations, and being possibly substituted by at least one substituent —OAlk, Alk representing an alkyl group comprising from 1 to 10 carbon atoms;

$A_2$ represents a divalent alkylene radical, which is linear or branched, wherein the number of carbon atoms is greater than or equal to 10, the said radical possibly comprising one or more unsaturations, and being possibly substituted by at least one substituent —OAlk, Alk representing an alkyl group comprising from 1 to 10 carbon atoms;

$A_3$ is selected from the group consisting of the following divalent radicals:
  a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
  an arylene comprising from 6 to 30 carbon atoms, the said radical being possibly substituted by at least one substituent —OAlk, Alk representing an alkyl group comprising from 1 to 10 carbon atoms;

$X_1$, $X_3$ and $X_4$, which may be identical or different, represent, independently of one another, —O— or —NH—;

$X'_2$ is selected from the group consisting of: —S—, —CH$_2$— and a bond;

on the condition that the total number of carbon atoms of the radicals $A_1$, $A_2$ and $X'_2$ is greater than or equal to 10;

n and m represent, independently of one another, an integer ranging from 1 to 1000;

$A_4$ represents a divalent alkylene radical, which is linear or branched, comprising from 1 to 20 carbon atoms, the said radical possibly comprising at least one unsaturation; and t and s represent, independently of one another, an integer ranging from 1 to 5000.

6. A compound having the following formula (IV):

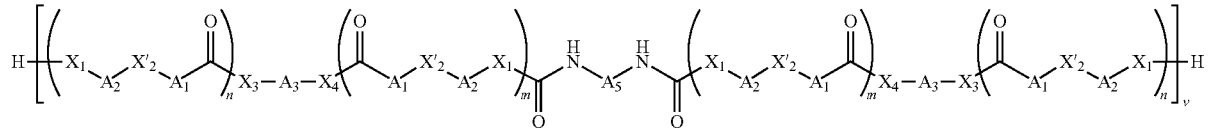

wherein:
  $A_1$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;

$A_2$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;

$A_3$ is selected from the group consisting of the following divalent radicals:
  a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
  an arylene comprising from 6 to 30 carbon atoms, the said radical being possibly substituted by at least one substituent —OAlk, Alk representing an alkyl group comprising from 1 to 10 carbon atoms;

$X_1$, $X_3$ and $X_4$, which may be identical or different, represent, independently of one another, —O— or —NH—;

$X'_2$ is selected from the group consisting of: —S—, —CH$_2$— and a bond;

on the condition that the total number of carbon atoms of the radicals $A_1$, $A_2$ and $X'_2$ is greater than or equal to 8;

n and m represent, independently of one another, an integer ranging from 1 to 1000;

$A_5$ is selected from the group consisting of the radicals:
  alkylene, which is linear or branched, comprising from 1 to 20 carbon atoms, the said radical possibly comprising at least one unsaturation;
  arylene, comprising from 6 to 20 carbon atoms, the said arylene radical being possibly substituted;
  cycloalkylene, comprising from 3 to 20 carbon atoms, the said cycloalkylene radical being possibly substituted;
  cycloalkylene-alkylene-cycloalkylene comprising from 6 to 30 carbon atoms; and
  alkylene-cycloalkylene comprising from 4 to 15 carbon atoms; and v represents an integer ranging from 1 to 5000.

7. A compound having the following formula (V):

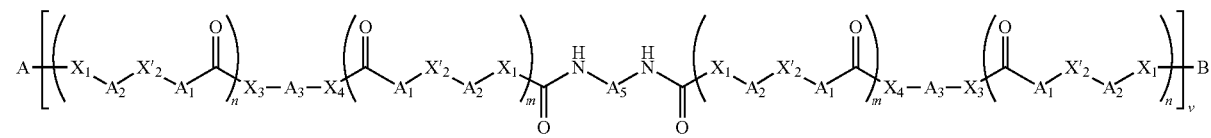

wherein:
- $A_1$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
- $A_2$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
- $A_3$ is selected from the group consisting of the following divalent radicals:
  - a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
  - an arylene comprising from 6 to 30 carbon atoms, the said radical being possibly substituted by at least one substituent —OAlk, Alk representing an alkyl group comprising from 1 to 10 carbon atoms;
- $X_1$, $X_3$ and $X_4$, which may be identical or different, represent, independently of one another, —O— or —NH—;
- $X'_2$ is selected from the group consisting of: —S—, —CH$_2$— and a bond;
- on the condition that the total number of carbon atoms of the radicals $A_1$, $A_2$ and $X'_2$ is greater than or equal to 8;
- n and m represent, independently of one another, an integer ranging from 1 to 1000;
- A and B represent the following radicals:

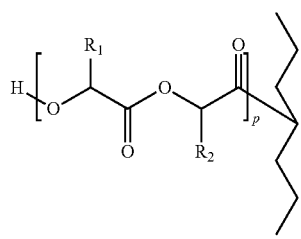

A

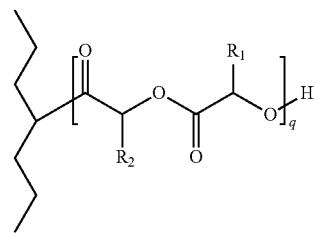

B

- $A_5$ is selected from the group consisting of the radicals:
  - alkylene, which is linear or branched, comprising from 1 to 20 carbon atoms, the said radical possibly comprising at least one unsaturation;
  - arylene, comprising from 6 to 20 carbon atoms, the said arylene radical being possibly substituted;
  - cycloalkylene, comprising from 3 to 20 carbon atoms, the said cycloalkylene radical being possibly substituted;
  - cycloalkylene-alkylene-cycloalkylene comprising from 6 to 30 carbon atoms; and
  - alkylene-cycloalkylene comprising from 4 to 15 carbon atoms;
- v represents an integer ranging from 1 to 5000, and
- p and q represent, independently of one another, an integer ranging from 1 to 5000.

8. A compound having the following formula (VI):

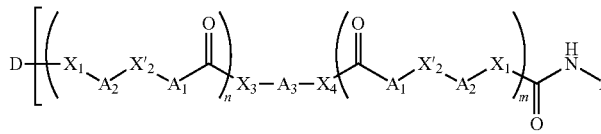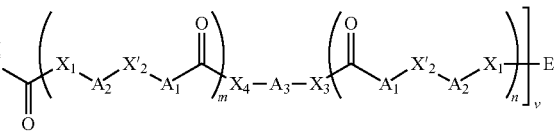

wherein:
- $A_1$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
- $A_2$ represents a divalent alkylene radical, which is linear or branched, comprising from 2 to 20 carbon atoms, the said radical possibly comprising one or more unsaturations, and being possibly substituted by at least one substituent —OAlk, Alk representing an alkyl group comprising from 1 to 10 carbon atoms;
- $A_3$ is selected from the group consisting of the following divalent radicals:
  - a linear or branched alkylene, comprising from 2 to 600 carbon atoms, the said radical possibly comprising one or more unsaturations, being possibly interrupted by at least one heteroatom selected from O, N and S, and being possibly substituted by at least one substituent —OAlk, Alk representing an alkyl group comprising from 1 to 10 carbon atoms; and
  - an arylene comprising from 6 to 30 carbon atoms, the said radical being possibly substituted by at least one substituent —OAlk, Alk representing an alkyl group comprising from 1 to 10 carbon atoms;
- $X_1$, $X_3$ and $X_4$, which may be identical or different, represent, independently of one another, —O— or —NH—;

X'$_2$ is selected from the group consisting of: —S—, —CH$_2$— and a bond;
on the condition that the total number of carbon atoms of the radicals A$_1$, A$_2$ and X'$_2$ is greater than or equal to 8;
n and m represent, independently of one another, an integer ranging from 1 to 1000;
D and E represent the following radicals:

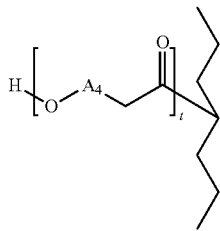

D

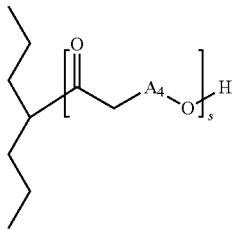

E v represents an integer ranging from 1 to 5000,
t and s represent, independently of one another, an integer ranging from 1 to 5000;
A$_4$ represents a divalent alkylene radical, which is linear or branched, comprising from 1 to 20 carbon atoms, the said radical possibly comprising at least one unsaturation; and A$_5$ is selected from the group consisting of the radicals:
alkylene, which is linear or branched, comprising from 1 to 20 carbon atoms, the said radical possibly comprising at least one unsaturation;
arylene, comprising from 6 to 20 carbon atoms, the said arylene radical being possibly substituted;
cycloalkylene, comprising from 3 to 20 carbon atoms, the said cycloalkylene radical being possibly substituted;
cycloalkylene-alkylene-cycloalkylene comprising from 6 to 30 carbon atoms; and
alkylene-cycloalkylene comprising from 4 to 15 carbon atoms.

9. Adhesives, surfactants, films, thermoplastic elastomers, paints or fibers comprising the compound having the formulas (IV) according to claim 6.

10. A composition comprising a matrix of polyester, poly(vinyl chloride), polyurethane, polyamide, poly(alkyl acrylate), poly(alkyl methacrylate), polystyrene or polyolefin, and at least one compound having the formulas (II), (III), (IV), (V) or (VI) such as defined in claim 1, or mixtures thereof, and possibly at least one other polymer.

11. The method according to claim 2, wherein the matrix is poly(lactic acid).

12. The composition according to claim 10, wherein the other polymer is selected from the group consisting of poly (butadiene), poly (isoprene), poly (ε-caprolactone), poly (tetrahydrofuran) and poly (ricinoleic acid).

13. The Adhesives, surfactants, films, thermoplastic elastomers, paints or fibers comprising a compound having the formula (V) according to claim 7.

14. The Adhesives, surfactants, films, thermoplastic elastomers, paints or fibers comprising a compound having the formula (VI) according to claim 8.

* * * * *